(12) United States Patent
Katsuhiro et al.

(10) Patent No.: US 7,527,111 B2
(45) Date of Patent: May 5, 2009

(54) DRIVING DEVICE FOR HYBRID VEHICLE, AND HYBRID VEHICLE INCORPORATING THE SAME

(75) Inventors: Arai Katsuhiro, Shizuoka-ken (JP); Tetsushi Saitou, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 50 days.

(21) Appl. No.: 11/426,244

(22) Filed: Jun. 23, 2006

(65) Prior Publication Data

US 2006/0289208 A1 Dec. 28, 2006

(30) Foreign Application Priority Data

Jun. 23, 2005 (JP) ............................. 2005-184142

(51) Int. Cl.
*B60K 1/00* (2006.01)
(52) U.S. Cl. .................... 180/65.2; 180/65.3; 180/65.4; 180/229; 903/902
(58) Field of Classification Search ................ 180/65.2, 180/65.3, 65.6, 65.8, 65.4, 229, 220; 903/902, 903/918, 926, 903; 475/15, 5
See application file for complete search history.

(56) References Cited

U.S. PATENT DOCUMENTS

| | | | |
|---|---|---|---|
| 3,566,165 A | 2/1971 | Lohr | |
| 3,921,745 A | 11/1975 | McCulloch et al. | |
| 4,132,281 A | 1/1979 | Gaddi | |
| 4,467,407 A | 8/1984 | Asano | |
| 4,536,668 A | 8/1985 | Boyer | |
| 4,763,538 A * | 8/1988 | Fujita et al. ................ | 180/65.2 |
| 4,829,208 A | 5/1989 | Uchino | |
| 5,014,800 A | 5/1991 | Kawamoto et al. | |
| 5,024,113 A | 6/1991 | Ito et al. | |
| 5,036,213 A | 7/1991 | Isozumi | |
| 5,087,229 A | 2/1992 | Hewko et al. | |
| 5,144,183 A | 9/1992 | Farrenkopf | |
| 5,272,938 A | 12/1993 | Hsu et al. | |
| 5,294,853 A | 3/1994 | Schluter et al. | |

(Continued)

FOREIGN PATENT DOCUMENTS

EP 0 555 773 8/1993

(Continued)

OTHER PUBLICATIONS

European Search Report for EP 06 01 2979, dated Oct. 3, 2006.

(Continued)

*Primary Examiner*—Hau V Phan
(74) *Attorney, Agent, or Firm*—Knobbe, Martens, Olson & Bear, LLP

(57) ABSTRACT

An engine produces power, which is distributed by a power distribution device to an electric generator and a rear wheel. A motor produces power other than that produced by the engine to drive the rear wheel. A battery stores electricity generated by the electric generator and supplies electricity to the electric generator and the motor. A hybrid control unit (HCU) controls the engine, the electric generator and the motor. The HCU drives a decompression device provided in the engine to reduce the pressure inside an engine cylinder created while cranking the engine, in order to stop the engine.

11 Claims, 9 Drawing Sheets

U.S. PATENT DOCUMENTS

| | | | | |
|---|---|---|---|---|
| 5,304,878 | A | 4/1994 | Oda et al. | |
| 5,442,250 | A | 8/1995 | Stridsberg | |
| 5,505,277 | A | 4/1996 | Suganuma et al. | |
| 5,570,752 | A | 11/1996 | Takata | |
| 5,581,136 | A | 12/1996 | Li | |
| 5,588,498 | A | 12/1996 | Kitada | |
| 5,595,257 | A | 1/1997 | Yoshida et al. | |
| 5,691,584 | A | 11/1997 | Toida et al. | |
| 5,755,304 | A | 5/1998 | Trigg et al. | |
| 5,798,702 | A | 8/1998 | Okamoto et al. | |
| 5,818,134 | A | 10/1998 | Yang et al. | |
| 5,826,675 | A | 10/1998 | Yamamoto | |
| 5,899,828 | A | 5/1999 | Yamazaki et al. | |
| 5,915,493 | A | 6/1999 | Nakayama | |
| 5,960,901 | A | 10/1999 | Hanagan | |
| 6,011,366 | A | 1/2000 | Murakami et al. | |
| 6,046,518 | A | 4/2000 | Williams | |
| 6,048,289 | A * | 4/2000 | Hattori et al. | 180/65.2 |
| 6,116,363 | A | 9/2000 | Frank | |
| 6,121,711 | A | 9/2000 | Nakahara et al. | |
| 6,155,366 | A | 12/2000 | Lin | |
| 6,158,543 | A * | 12/2000 | Matsuto et al. | 903/902 |
| 6,190,282 | B1 * | 2/2001 | Deguchi et al. | 180/65.2 |
| 6,190,283 | B1 | 2/2001 | Uchida | |
| 6,199,652 | B1 | 3/2001 | Mastroianni et al. | |
| 6,252,377 | B1 | 6/2001 | Shibutani et al. | |
| 6,276,481 | B1 | 8/2001 | Matsuto et al. | |
| 6,315,068 | B1 | 11/2001 | Hoshiya | |
| 6,321,863 | B1 | 11/2001 | Vanjani | |
| 6,522,959 | B1 | 2/2003 | Sawamura et al. | |
| 6,590,306 | B2 | 7/2003 | Terada | |
| 6,736,227 | B2 | 5/2004 | Huang et al. | |
| 6,752,226 | B2 | 6/2004 | Naito et al. | |
| 6,765,327 | B2 | 7/2004 | Hashimoto et al. | |
| 6,799,650 | B2 | 10/2004 | Komiyama et al. | |
| 6,823,954 | B2 | 11/2004 | Shimabukuro et al. | |
| 6,994,652 | B2 | 2/2006 | Atarashi et al. | |
| 7,006,906 | B2 | 2/2006 | Kobayashi et al. | |
| 7,017,694 | B2 | 3/2006 | Shirazawa | |
| 7,023,102 | B2 | 4/2006 | Itoh | |
| 7,047,116 | B2 | 5/2006 | Ishikawa et al. | |
| 7,071,642 | B2 | 7/2006 | Wilton et al. | |
| 7,077,223 | B2 | 7/2006 | Kubodera et al. | |
| 7,104,347 | B2 * | 9/2006 | Severinsky et al. | 180/65.2 |
| 7,223,200 | B2 * | 5/2007 | Kojima et al. | 475/15 |
| 7,228,209 | B2 | 6/2007 | Izawa et al. | |
| 7,328,091 | B2 | 2/2008 | Kimura | |
| 2001/0010439 | A1 | 8/2001 | Klingler et al. | |
| 2003/0019455 | A1 | 1/2003 | Onozawa et al. | |
| 2003/0026118 | A1 | 2/2003 | Ikimi | |
| 2003/0221887 | A1 | 12/2003 | Hsu | |
| 2004/0055799 | A1 | 3/2004 | Atarashi et al. | |
| 2004/0060753 | A1 | 4/2004 | Ito et al. | |
| 2004/0158365 | A1 | 8/2004 | Tabata et al. | |
| 2004/0173393 | A1 | 9/2004 | Man et al. | |
| 2004/0213371 | A1 | 10/2004 | Bruder et al. | |
| 2005/0111246 | A1 | 5/2005 | Lai | |
| 2006/0030454 | A1 | 2/2006 | Uchisasai et al. | |
| 2006/0032690 | A1 * | 2/2006 | Inomoto et al. | 180/229 |
| 2006/0090945 | A1 | 5/2006 | Ishida et al. | |
| 2006/0207812 | A1 | 9/2006 | Saitou | |
| 2006/0219447 | A1 | 10/2006 | Saitou et al. | |
| 2006/0260851 | A1 | 11/2006 | Taue et al. | |
| 2007/0017723 | A1 | 1/2007 | Terada et al. | |
| 2007/0029121 | A1 | 2/2007 | Saitou et al. | |
| 2007/0216226 | A1 | 9/2007 | Matsumoto et al. | |
| 2007/0216452 | A1 | 9/2007 | Matsumoto et al. | |

FOREIGN PATENT DOCUMENTS

| | | | | |
|---|---|---|---|---|
| EP | 0 604 981 | A2 | 7/1994 | |
| EP | 0 819 561 | A2 | 1/1998 | |
| EP | 0 980 821 | A2 | 2/2000 | |
| EP | 1 065 362 | A1 | 1/2001 | |
| EP | 1 151 892 | | 11/2001 | |
| EP | 1 270 302 | | 1/2003 | |
| EP | 1 447 282 | A2 | 8/2004 | |
| EP | 1 447 530 | | 8/2004 | |
| EP | 1 518 737 | | 3/2005 | |
| EP | 1 526 020 | | 4/2005 | |
| EP | 1 574 379 | | 9/2005 | |
| EP | 1 705 049 | A2 | 9/2006 | |
| JP | 2-7702 | | 1/1990 | |
| JP | 2-37027 | | 2/1990 | |
| JP | 03-215154 | | 9/1991 | |
| JP | 4-185207 | | 7/1992 | |
| JP | 5-300712 | | 11/1993 | |
| JP | 8-175474 | | 7/1996 | |
| JP | 08 175477 | | 7/1996 | |
| JP | 8-256403 | | 10/1996 | |
| JP | 9-191501 | | 7/1997 | |
| JP | 10-080001 | | 3/1998 | |
| JP | 11-122886 | | 4/1999 | |
| JP | 11-034965 | | 9/1999 | |
| JP | 2000-337192 | | 5/2000 | |
| JP | 2000-261911 | | 9/2000 | |
| JP | 2000-261988 | | 9/2000 | |
| JP | 2000-343964 | | 12/2000 | |
| JP | 2001-105899 | | 4/2001 | |
| JP | 2001-298901 | | 10/2001 | |
| JP | 2001-341685 | | 12/2001 | |
| JP | 2002-021601 | | 1/2002 | |
| JP | 2002-262404 | | 9/2002 | |
| JP | 2002-325412 | | 11/2002 | |
| JP | 2003-191761 | | 7/2003 | |
| JP | 2003-191883 | | 7/2003 | |
| JP | 2004-007919 | | 1/2004 | |
| JP | 2004060498 | A * | 2/2004 | 903/922 |
| JP | 2004-166369 | | 10/2004 | |
| JP | 2005-098251 | | 4/2005 | |
| WO | WO 00/43259 | A1 | 7/2000 | |
| WO | WO 2004/054836 | | 7/2004 | |

OTHER PUBLICATIONS

Co-Pending U.S. Appl. No. 11/298,979, filed Dec. 9, 2005, in the name of Hino, et al.

Co-Pending U.S. Appl. No. 11/335,868, filed Jan. 18, 2006, in the name of Naitou, et al.

Co-Pending U.S. Appl. No. 11/426,218, filed Jun. 23, 2006, in the name of Katsuhiro, et al.

Search Report for European Patent Application No. EP 06 01 2978, dated Dec. 20, 2006.

European Search Report for EP 1 270 395, dated Mar. 23, 2005.

European Search Report for EP 07 00 3224, dated Apr. 24, 2007.

European Search Report for EP 07 00 5511 dated May 16, 2007.

Non-final Office Action mailed Oct. 15, 2007 received in U.S. Appl. No. 11/389,514.

Non-final Office Action mailed Jun. 9, 2008 received in U.S. Appl. No. 11/429,116.

* cited by examiner

DRIVING DEVICE FOR HYBRID VEHICLE, AND HYBRID VEHICLE INCORPORATING THE SAME

CROSS-REFERENCE TO RELATED APPLICATIONS

The present application is based on and claims priority under 35 U.S.C. 119 to Japanese Patent Application No. 2005-184142, filed on Jun. 23, 2005, the entire contents of which are incorporated by reference and should be considered part of this specification.

FIELD OF THE INVENTION

The present invention relates to a driving device for a hybrid vehicle using plural driving sources to operate, and to a hybrid vehicle having said driving device.

BACKGROUND OF THE INVENTION

There is interest, from an environmental point of view, to reduce the discharge of environmental pollutants from engine-driven vehicles as much as possible. In consideration of this, hybrid vehicles have been developed which utilize an electric motor in addition to an internal combustion engine to drive a driving wheel or driving wheels of the vehicle using the electric motor.

Hybrid vehicles achieve reductions in noise and air pollution by using mainly the electric motor as the power source for the vehicle while the vehicle operates steadily. Hybrid vehicles additionally use the engine to avoid the drawbacks of electric vehicles driven solely by an electric motor. For example, the additional use of the engine avoids problems such as the limited running distance per battery charge, and the inadequate response during rapid start-up, high-load or high-speed operating conditions due small power generation output from the electric motor.

Hybrid vehicles include parallel hybrid vehicles, in which at least one of an internal combustion engine and an electric motor can be switched on and off depending on the running condition of the vehicle and the remaining amount of electricity in a battery (e.g., secondary battery) charged by an electric generator. Another type of the hybrid vehicles is series hybrid vehicles, in which a driving wheel of the vehicle is driven by a drive motor, which in turn is driven solely by electricity generated by an electric generator that is driven by an internal combustion engine.

Series-parallel hybrid vehicles have also been developed, a combination of the series hybrid and the parallel hybrid vehicles, in which engine output is distributed by a power distribution device using a planetary gear mechanism to drive a driving wheel, as disclosed for example in Japanese Patent No. JP 2003-191761.

The power distribution device splits engine power into a vehicle driving force to be mechanically transmitted to the driving wheel to drive the driving wheel directly, and an electricity generation driving force to actuate the electric generator to generate electricity. That is, the power distribution device uses a portion of engine power to rotate the driving wheel and another portion to drive the electric generator. The electricity generated by the electric generator is supplied to the electric motor to run the motor, and the power produced by the motor in response to the supplied electricity is added, by the power distribution device, to one of the split portions to assist the driving force communicated to the driving wheel.

The use of a hybrid drive unit using the power distribution device as described above allows the hybrid vehicle to operate the engine at the most preferable fuel consumption rate.

In general, hybrid vehicles having the power distribution device described above can have an operating state in which the vehicle is powered and propelled by both the electric motor and the internal combustion engine at the same time, as well as an operating state where the engine is stopped while the vehicle is powered by the engine and the motor. Also, hybrid vehicles having the power distribution device described above can be in an operating state where combustion does not take place in the engine, though the crankshaft of the engine rotates and the pistons coupled to the crankshaft reciprocate.

During a transitions between operating states, such as the operating states discussed above, an abrupt change in the driving wheel propulsion force causes an impact on the vehicle before the crankshaft comes to a complete stop, even when the motor is outputting constant torque.

In order to cope with such an impact, hybrid vehicles having the power distribution device use, for example, a variable valve mechanism to control pumping loss of the engine. Even with the use of the variable valve mechanism, however, the in-cylinder pressure cannot be reduced through the entire compression stroke of the engine because of limitations on the phase range within which valve timing can be varied. Thus, even with the use of the variable valve mechanism, the in-cylinder pressure remains slightly compressed, which as pumping loss causes an impact during transition to an operating state where the engine is completely stopped, that is, to a state where rotation of the crankshaft is completely stopped.

In order to cope with such an impact related to engine stop, it is also possible to use a valve stop mechanism to control the operation of valves, such as keeping intake and exhaust valves closed throughout the stroke and restrict ventilation inside the cylinder. One such valve stop mechanism is a REV (revolution-modulated valve control) system.

In this way, air compressed inside the cylinder is expanded generally equally, which reduces the crank torque necessary to maintain the rotation of the crankshaft, as compared to the case where ventilation is not restricted. That is, in general-purpose engines, a sudden change in torque can be lessened to a negligible level during transition from engine operation with ignition to an operating state without combustion but with rotation of the crankshaft and reciprocation of the pistons. With this construction, however, in the transition process to stop the rotation of the crankshaft, the compressed in-cylinder pressure restrains the rotation of the crankshaft, which causes a sudden change in torque and hence impact before the crankshaft stops.

Such impact at a transition of operating states, such as engine stop, does not affect operation by an operator in the case of automobiles, in which the engine is mounted in an engine compartment.

In recent years, the drive unit having a power distribution device, as described above, has also been applied to motorcycles.

The operating direction of a motorcycle is determined by an increase and decrease in the driving wheel propulsion force that occurs while the vehicle is turning, based on the principle of two-wheel operation. Thus, it is necessary to differentiate an increase and decrease in the driving wheel propulsion force intended by the operator and those not intended by the operator. The unintentional increase and decrease are preferably as small as possible since they can affect the operating state interpreted or sensed by the operator.

That is, in the case where the hybrid drive unit using the power transmission device disclosed in JP 2003-191761 is mounted on a motorcycle, an impact which occurs when the engine is stopped while the vehicle is running or during transition to an operating state without combustion but with continuing rotation of the crankshaft and reciprocation of the piston(s) is an unintentional increase and decrease in propulsion force that need to be decreased. This is because even an impact when the engine is stopped, which does not affect automobiles, can be sensed by operators of motorcycles as an unintentional increase and decrease in propulsion force.

In order to eliminate such impact, it is conceivable to increase the capacity of the battery to supply current to the motor or increase torque generated by the motor. However, a motorcycle has a limited mounting space compared to an automobile and thus cannot accommodate a battery which becomes larger as its charging capacity increases, or a larger motor for producing increased torque.

Thus, there is a need for a hybrid motorcycle in which impact due to fluctuations in crankshaft torque, which changes abruptly at engine stop, can be reduced so that impact during transition to an operating state related to engine stop can be reduced.

SUMMARY OF THE INVENTION

In accordance with an aspect of the invention, a driving device for a hybrid vehicle (e.g., a motorcycle) is provided that can lessen an increase and decrease in propulsion force not intended by an operator when operating the vehicle, in particular when stopping the vehicle, thereby allowing the operator to easily operate the vehicle (e.g., motorcycle).

An aspect of the present invention involves a hybrid vehicle comprising an engine for producing power, a first rotary electric machine configured to operate as at least one of an electric generator and an electric motor, a power distribution device configured to distribute the power produced by the engine to the first rotary electric machine and to a driving wheel, and a second rotary electric machine configured to operate as at least one of an electric motor and an electric generator to produce power to drive the driving wheel. The vehicle also includes a battery that stores electricity generated by the first rotary electric machine and supplies electricity to at least one of the second rotary electric machine and the first rotary electric machine. A driving device of the vehicle includes a pressure reduction device provided in the engine for reducing a compression pressure inside a cylinder of the engine created while cranking the engine and a controller configured to control the pressure reduction device so as to reduce the compression pressure inside the engine cylinder when stopping the engine.

Another aspect of the invention involves a hybrid vehicle comprising an engine for producing power and a first rotary electric machine configured to operate as at least one of an electric generator and an electric motor. A power distribution device is configured to distribute the power produced by the engine to the first rotary electric machine and to a driving wheel. A second rotary electric machine is configured to operate as at least one of an electric motor and an electric generator to produce power to drive the driving wheel. A battery stores the electricity generated by the first rotary electric machine and supplies electricity to at least one of the second rotary electric machine and the first rotary electric machine. The vehicle also includes a pressure reduction device that is provided in the engine and that reduces a compression pressure inside a cylinder of the engine created while cranking the engine. Under at least some operating conditions, a controller controls the operation of the engine, the first rotary electric machine and the second rotary electric machine. The controller also controls the pressure reduction device to reduce the compression pressure inside the engine cylinder when stopping the engine.

Another aspect of the present invention involves a method of operating a hybrid vehicle having an internal combustion engine and an electric motor as power sources in which a driving wheel is driven by at least one of the engine and the motor. The vehicle also includes a power distribution device that distributes the power produced by the engine to a first rotary electric machine and to the driving wheel. The method involves reducing a rotational speed of the engine; stopping combustion in the engine; stopping fuel supply to the engine; closing a throttle valve of the engine; and reducing a compression pressure inside an engine cylinder when stopping the engine.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 9 figures.

DETAILED DESCRIPTION OF THE PREFERRED EMBODIMENTS

Figure 1:
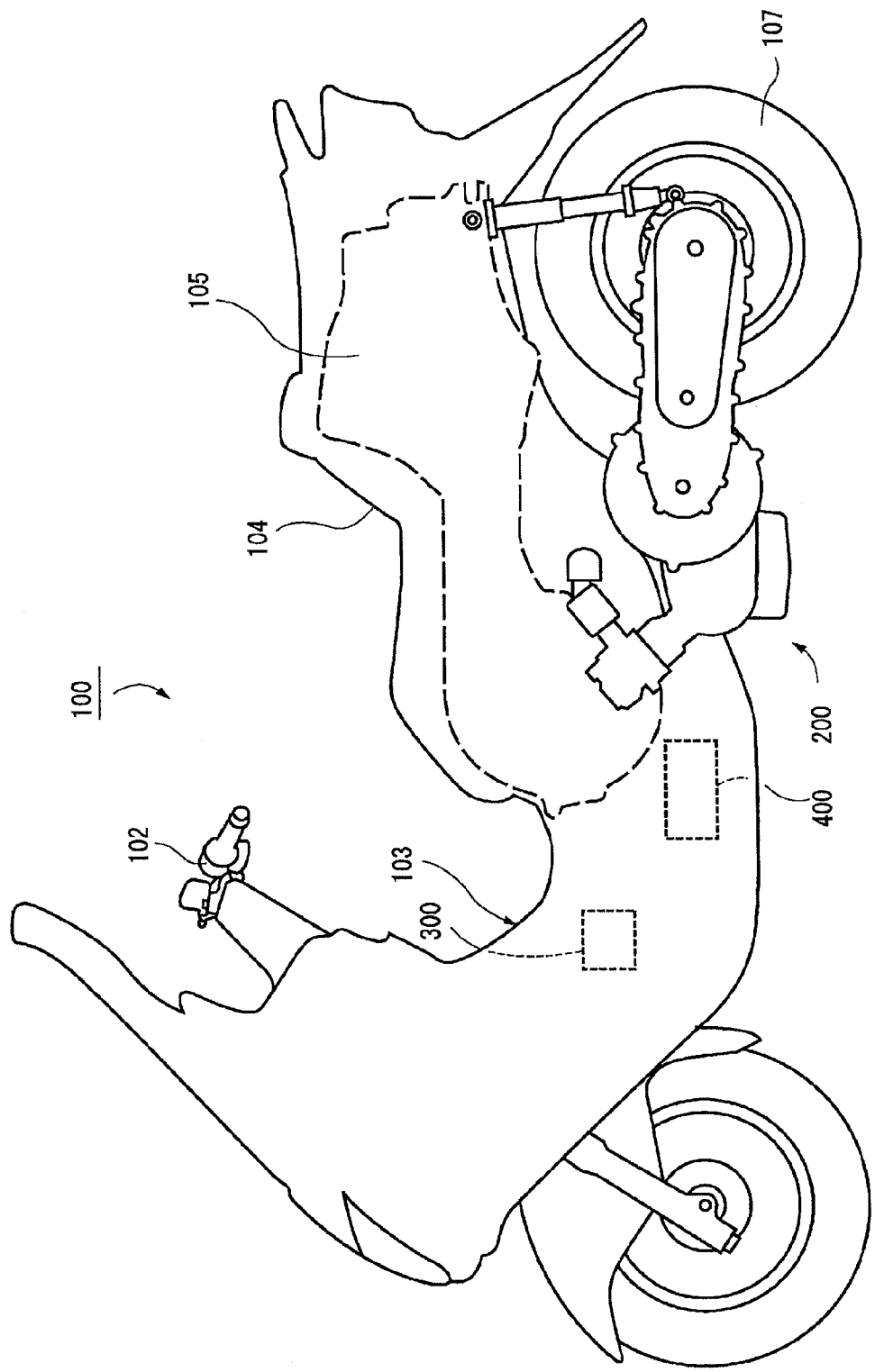
FIG. 1 is a schematic left side view of a scooter-type motorcycle incorporating one embodiment of a driving device for a hybrid vehicle.

FIG. 1 is a schematic left side view illustrating the construction of an essential part of a scooter-type motorcycle as an example of a hybrid vehicle incorporating a driving device for a hybrid vehicle according to an embodiment of the present invention. The driving device is described and illustrated in connection with this type of vehicle as has particular applicability to scooter-type vehicle; however, the driving device can be used with other types of vehicles as well.

The hybrid vehicle shown in FIG. 1 is a series-parallel hybrid scooter-type motorcycle in which a wheel is driven using an internal combustion engine and/or an electric motor as power sources. Specifically, in the hybrid vehicle (hereinafter referred to as "scooter-type motorcycle"), the engine power is split by a power split mechanism into two parts with a variable split ratio, of which one part is used to drive the wheel directly and the other part is used to generate electricity. In this embodiment, "front," "rear," "left," "right," "upper" and "lower" refer to the front, rear, left, right, upper and lower directions as viewed by the rider.

The scooter-type motorcycle 100 shown in FIG. 1 includes a vehicle body 103 for rotatably supporting handlebars 102 at a front part thereof, and a tandem seat 104 and a trunk space 105 located vertically on a rear side of the vehicle body 103. A drive unit 200 is located below the trunk space 105. The scooter-type motorcycle 100 includes a driving device that includes the drive unit 200 and a drive control device (hereinafter referred to as "control device") 300 (see FIG. 4) for controlling the drive unit 200.

Figure 2:
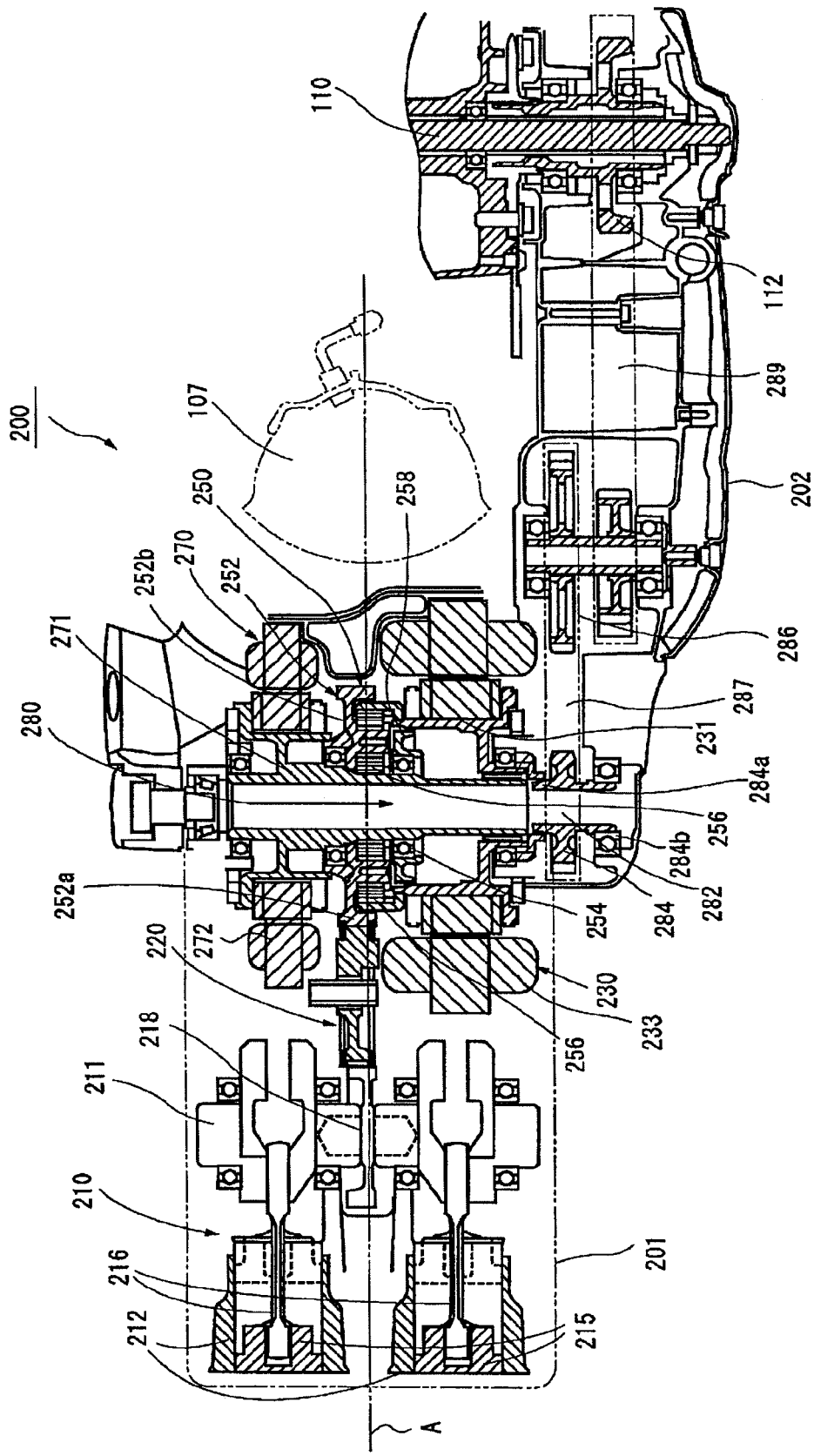
FIG. 2 is a schematic cross-sectional view of a drive unit of the scooter-type motorcycle shown in FIG. 1.

FIG. 2 is a schematic cross-sectional view illustrating the general construction of the drive unit 200 of the scooter-type motorcycle 100 shown in FIG. 1.

The drive unit 200 includes in its unit body 201 an internal combustion engine 210, an electric motor (e.g., second rotary electric machine) 230, a power distribution device 250, and an electric generator (first rotary electric machine) 270.

The engine 210, which is preferably a two-cylinder engine, is disposed below the trunk space 105 (see FIG. 1) of the scooter-type motorcycle 100. The engine 210 has two cylinders 212 parallel to and symmetric with respect to a vehicle central axis A as viewed in a plan view, and a crankshaft 211 extending generally parallel to the vehicle width direction. (e.g., generally transverse to the vehicle central axis A). Though the engine 210 has two cylinders in the illustrated embodiment, the engine 210 can have more or fewer than two cylinders in other embodiments.

The pistons 215 in the cylinders 212 are connected to the crankshaft 211 via connecting rods 216. The crankshaft 211 is rotated via the vertical motion of the pistons 215. That is, vertical motion of the pistons 215 rotates the crankshaft 211, which drives the engine 210.

The crankshaft 211 has a crank gear 218 for transmitting power to the power distribution device 250. The crank gear 218 is disposed between large ends of the connecting rods 216 coupled to the two pistons 215.

The crank gear 218 is in meshing engagement with an intermediate gear 220, which is preferably rotatable about a shaft parallel to the crankshaft 211, and the intermediate gear 220 is in meshing engagement with a gear 252a formed on an outer periphery of a planetary carrier 252 of the power distribution device 250.

Since the crankshaft 211 is coupled to the power distribution device 250 via the intermediate gear 220, the torque of the crankshaft 211 is transmitted to the power distribution device 250 and the driving force from the power distribution device 250 is transmitted to the crankshaft 211.

The power distribution device 250 is located on a shaft preferably disposed parallel to the crankshaft 211 together with the motor 230 and the electric generator 270, and is rotatable about the shaft. Specifically, the power distribution device 250 is disposed on a power shaft 280 formed by extending the shaft part of a rotor 271 of the electric generator 270 in its axial direction, and is rotatable about the power shaft 280. The motor 230 and the electric generator 270 are also rotatable about the axis of the power shaft 280.

The power distribution device 250 preferably splits the driving force transmitted from the engine 210 into a vehicle driving force to be transmitted to an axle 110 to drive a rear wheel 107 directly and an electricity generation driving force for causing the electric generator 270 to generate electricity.

As shown in FIG. 2, the power distribution device 250 is disposed between the motor 230 and the electric generator 270 on the power shaft 280.

In the power distribution device 250, the planetary carrier 252, which is preferably in meshing engagement with the intermediate gear 220 via the gear 252a on its outer periphery of the planetary carrier 252, is located axially adjacent to a sun gear 254 formed on an outer periphery of the power shaft 280. The planetary carrier 252 is rotatable coaxially with the sun gear 254 about the power shaft 280.

The planetary carrier 252 has planetary pins 252b extending generally parallel to the power shaft 280 and arranged, for example, on a circle about the axis of the power shaft 280. Planet gears 256 are rotatably mounted on the planetary pins 252b.

The planet gears 256 are preferably in meshing engagement with the sun gear 254 and revolve around the sun gear 254 while rotating on their own axes. The sun gear 254 is formed integrally with the shaft part of the rotor 271 of the electric generator 270 and constitutes a part of the power shaft 280.

A ring gear 258 is disposed around the planet gears 256 with its inner peripheral surface in meshing engagement with outer peripheries of the planet gears 256.

Since the ring gear 258 is combined with a rotor 231 of the motor 230, when the ring gear 258 rotates about the axis of the power shaft 280, the rotor 231 also rotates about the same axis. The motor 230 produces a driving force via the rotation of the rotor 231.

In the power distribution device 250, when the planetary carrier 252 is rotated via the driving force from the crankshaft 211, the planetary pins 252b provided integrally with the planetary carrier 252 rotate about the axis of the power shaft 280. Then, the planet gears 256 rotate in the same way and revolve around the sun gear 254. Since the sun gear 254 and the ring gear 258 are in meshing engagement with the planet gears 256, they both rotate.

Since the sun gear 254 is formed on the power shaft 280 and formed integrally with the shaft part of the rotor 271 of the electric generator 270, when the sun gear 254 rotates, the rotor 271 also rotates. Thus, the torque of the sun gear 254 functions as an electricity generation driving force to cause the electric generator 270 to generate electricity.

The electric generator 270 generates electricity by rotation of the rotor 271 rotatably disposed in a stator 272. As discussed above, the rotor 271 constitutes the power shaft 280. The electric generator 270 supplies the generated electricity to a battery (see FIGS. 1 and 4) 400 and the electric motor 230. In one embodiment, the electric generator 270 may function as a motor driven by electricity supplied from a battery, in addition to operating as an electric generator. For example, the electric generator 270 may serve as a starter motor for starting up the engine 210 when the charge amount of the battery is less than a specific charge level. The battery 400 stores electricity supplied from the electric generator 270 and supplies electricity to the electric motor 230 and the electric generator 270.

The power shaft 280 extends from one side (right side) of the vehicle through the electric generator 270 and the power distribution device 250 and is rotatably inserted into the motor 230 on the other side (left side) of the vehicle.

The rotary axis of the motor 230 is coaxial with the power shaft 280, and the motor 230 is located in front of the rear wheel 107 in alignment with the electric generator 270, with the power distribution device 250 therebetween. The rotor 231 is disposed in a stator 233 for rotation about the axis of the power shaft 280, and is formed in a cylindrical shape to receive the power shaft 280 for rotation.

The motor 230 may serve as a starter motor for starting up the engine 210 when the charge amount of the battery is less than a specific charge level. In one embodiment, the motor 230 functions as a regenerative motor for producing resistance to restrain the rotation of the axle 110 in the traveling direction during deceleration and braking.

In the motor 230, the rotor 231 is joined to one end 284a of a cylindrical body 282 of a sprocket 284 located on the other side (left side) of the vehicle and rotatable about the axis of the power shaft 280. The other end (the end on the other side of the vehicle) of the cylindrical body 282 of the sprocket 284 is supported by a bearing 284b.

The torque of the power shaft 280 is transmitted to the sprocket 284 via the sun gear 254, the planet gears 256, the ring gear 258 and the rotor 231. Then, the torque is transmitted from the sprocket 284 via a chain 287 entrained around the sprocket 284, a speed reduction gear section 286, a chain 289 and a sprocket 112 on the axle 110 at a rear part of the vehicle to the axle 110 to drive the rear wheel 107. The sprocket 284, the chain 287, the speed reduction gear section 286, the chain 289 and the sprocket 112 are housed in a cantilever rear arm part 202 of the drive unit 200.

The engine 210, the motor 230 and the electric generator 270 are coupled to each other via the planetary carrier 252, the ring gear 258 and the sun gear 254 in the power distribution device 250 having a planetary gear mechanism as described above.

In the power distribution device 250, when the rotational speeds of two of the planetary carrier 252, the ring gear 258 and the sun gear 254 are determined, the rotational speed of the remaining one is indirectly determined.

Figure 3:
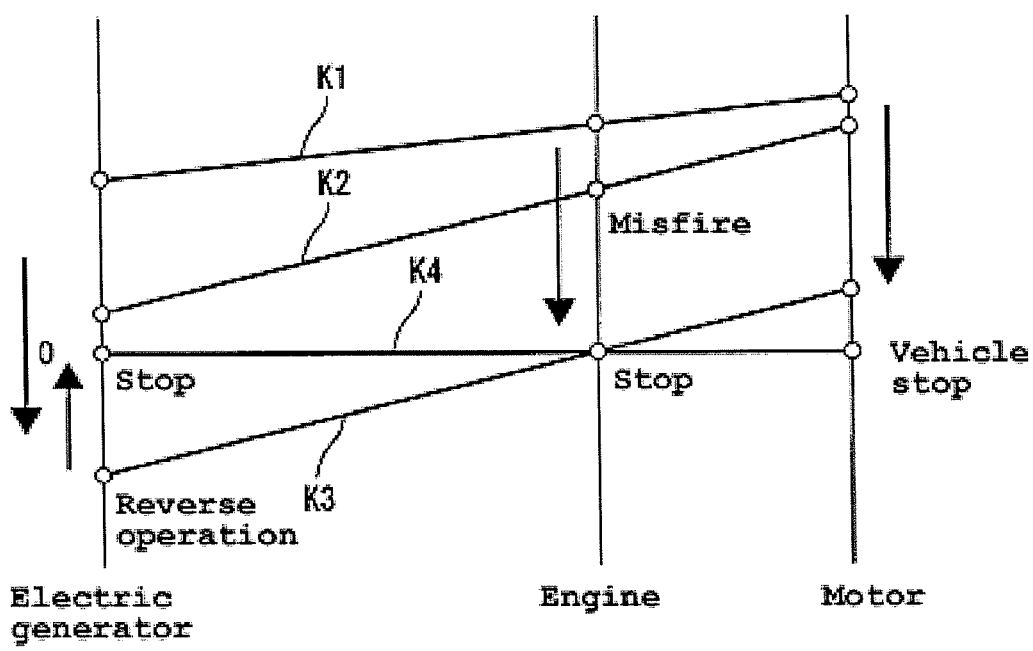
FIG. 3 is a collinear chart of an electric generator, an engine and a motor in a control device for a hybrid vehicle according to one embodiment.

FIG. 3 is a collinear chart illustrating an example of operational relationship among the electric generator 270, the engine 210 and the motor 230 via the power distribution device 250 in the hybrid vehicle 100. In FIG. 3, the vertical axis represents rotational speed achieved via the drive unit 200 and controlled by the control device 300, and lines K1 to K4 are collinear lines illustrating the operation of the engine 210, electric motor 230 and electric generator 270.

As shown by the collinear lines K1 to K4 in FIG. 3, in the power distribution device 250 having a planetary gear mechanism, the respective gear rotational speeds of the electric generator 270 (sun gear 254), the engine 210 (planetary carrier 252) and the motor 230 (ring gear 258) can be connected by a straight line.

In FIG. 3, the collinear line K1 represents a state where the vehicle is running with the engine in operation, and the collinear line K2 represents a state where the vehicle is braking with the engine misfiring. The collinear line K3 represents an operating state with the engine stopped, and the collinear line K4 represents a state where the vehicle is at a complete stop. When stopping the scooter-type motorcycle 100, the vehicle transitions sequentially from K1 to K4.

Therefore, when the rotational speeds of two of the electric generator 270 (rotor 271), the motor 230 (rotor 231) and the engine are determined, the rotational speed of the remaining one is indirectly determined. That is, the rotational speed of the engine 210 is indirectly determined by determining the rotational speeds of the electric generator 270 and the motor 230. Since the rotational speed of the rotor 231 of the motor 230 is synchronized with the rotational speed of the rear wheel 107 as a driving wheel, that is, the traveling speed of the vehicle, the rotational speed of the engine 210 is determined by controlling the rotational speed of the electric generator 270.

In the scooter-type motorcycle 100 having the drive unit 200 including the power distribution device 250 as described above, the rear wheel 107 is rotated by at least one of the engine 210 and the motor 230 via the power distribution device 250.

The operation of the drive unit 200 including the engine 210 and the motor 230 is determined by the control device 300 (see FIG. 4) based on the running condition of the scooter-type motorcycle 100 and the charge amount of the battery 400 (see FIGS. 1 and 4) for storing electricity for driving the motor 230.

Figure 4:
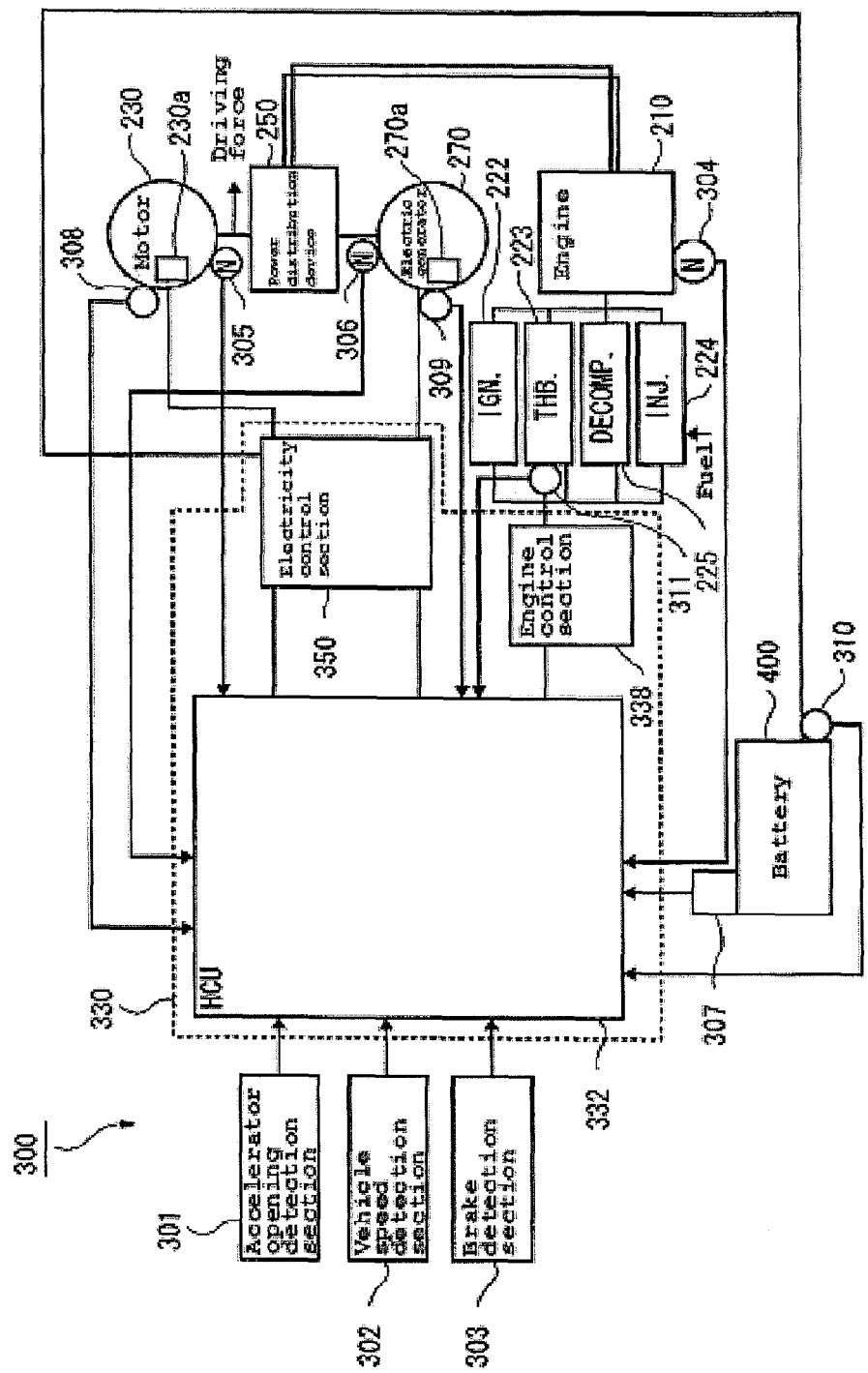
FIG. 4 is a block diagram illustrating the general construction of the control device for a hybrid vehicle according to one embodiment.

FIG. 4 is a block diagram illustrating the general construction of the control device 300 for a hybrid vehicle according to one embodiment. In FIG. 4, the lines connecting the power distribution device 250, the engine 210, the motor 230 and the electric generator 270 are power transmission lines representing mechanically transmitted power.

The control device 300 shown in FIG. 4 includes, in addition to the control unit 330, an accelerator opening detection section 301, a vehicle speed detection section 302, a brake detection section 303, an engine speed sensor 304, a motor speed sensor 305, an electric generator speed sensor 306, a remaining battery level sensor 307, a motor current sensor 308, an electric generator current sensor 309, a battery current sensor 310, a throttle opening sensor 311, and so on.

The accelerator opening detection section 301 detects the accelerator opening variable by operation of an accelerator by the vehicle operator of the scooter-type motorcycle 100 and outputs it as accelerator opening information to the control unit 330. The vehicle speed detection section 302 detects the vehicle speed and outputs it as vehicle speed information to the control unit 330. The brake detection section 303 detects the degree of operation of a brake lever by the vehicle operator and outputs it as brake information to the control unit 330.

The speed sensors 304, 305 and 306 respectively detect the rotational speeds of the engine 210, the motor 230 and the electric generator 270 and output them as engine speed information, motor speed information and electric generator speed information, respectively, to the control unit 330.

The remaining battery level sensor 307 detects the state of charge (SOC), that is, the remaining battery level, of the battery 400 and outputs it as remaining battery level information to the control unit 330.

The motor current sensor 308 detects the current flowing into and out of the motor 230 and outputs it as motor input-output current information (hereinafter referred to as "motor current information") to the control unit 330.

The electric generator current sensor 309 detects the current flowing into and out of the electric generator 270 and outputs it as electric generator input-output current information (hereinafter referred to as "electric generator current information") to the control unit 330.

The battery current sensor 310 detects the current flowing into and out of the battery 400 and outputs it as battery input-output current information (hereinafter referred to as "battery current information") to the control unit 330.

The throttle opening sensor 311 detects the throttle opening, specifically the valve opening of a throttle valve 223, of the engine 210 and outputs it as throttle opening information to the control unit 330.

Based on the information input from the detection sections 301 to 303 and the sensors 304 to 311, the control unit 330 controls the driving of the engine 210, the motor 230, the electric generator 270 and the battery 400 to control the operation of the vehicle.

The control unit 330 includes a hybrid control unit (hereinafter referred to as "HCU") 332 as a main control section for controlling the operation of the vehicle, an electricity control section 350 for controlling the inputs to and outputs from the motor 230, the electric generator 270 and the battery 400, and an engine control section 338.

The HCU 332 receives the accelerator opening information from the accelerator opening detection section 301, the vehicle speed information from the vehicle speed detection section 302, and the brake information from the brake detection section 303.

The HCU 332 also receives the engine speed information, the motor speed information and the electric generator speed information from the speed sensors 304 to 306, respectively, and the remaining battery level information from the remaining battery level sensor 307.

The HCU 332 further receives the motor current information, the electric generator current information and the battery current information from the current sensors 308 to 310, respectively, and the throttle opening information from the throttle opening sensor 311.

Based on the input information, the HCU 332 outputs a drive command to the electricity control section 350 and the engine control section 338 to control the operation of the vehicle 100 in response to vehicle operator commands. For example, the HCU 332 outputs a drive command to the electricity control section 350 and the engine control section 338 based on the accelerator opening information so that torque proportional to the accelerator opening can be applied to the rear wheel.

In other words, the HCU 332 determines the operating state of the vehicle, including a stationary state, based on the input accelerator opening information, vehicle speed information, brake information, speed information, current information, remaining battery level information on the battery 400 and throttle opening information, and controls the operation of the vehicle based on the determined operating state of the vehicle. The HCU 332 controls the operation of the vehicle by controlling the operation of the engine 210, the motor 230, the electric generator 270 and the battery 400 in plural operation modes. In particular, operation modes related to engine stop include an engine stationary mode, in which the engine 210 experiences a misfire at its plug and the crankshaft comes to a complete stop, a regenerative braking mode in which the motor 230 performs regeneration, and an engine crank braking mode.

The regenerative braking mode includes two modes, namely a cranking regeneration mode (first regeneration mode) and an engine stationary regeneration mode (second regeneration mode).

The cranking regeneration mode is in effect when the vehicle speed is greater than a specific speed (e.g., at which the engine 210 cannot stop) during the braking operation of the vehicle 100. In the cranking regeneration mode, the decompression device 225 is turned on, the engine 210 is cranked, and the motor 230 operates in regeneration mode.

The engine stationary regeneration mode is in effect when the vehicle speed is lower than a specific speed. In the engine stationary regeneration mode, a misfire is caused in the engine 210 and the decompression device 225 is turned off, the engine is stopped, and the motor 230 performs regeneration. Vehicle speeds lower than a specific speed (e.g., lower than a specific value) preferably correspond to a range within which the engine 210 can be stopped, and the specific speed is determined based on the vehicle speed, the minimum rotational speed of the electric generator 270, and the gear ratio of the power distribution device 250 mechanically connecting the electric generator 270, the engine 210 and the motor 230.

For example, in the collinear chart of the electric generator 270, the engine 210 and the motor 230 (see FIG. 3), the specific vehicle speed is indicated as a speed corresponding to the motor speed with the engine 210 stationary at 0 and the electric generator 270 at its minimum rotational speed.

In the regenerative braking mode, when the vehicle speed is not lower than a specific speed, the HCU 332 drives the decompression device 225 to reduce the compression pressure inside the cylinder, cranks the engine 210, and causes the motor 230 to perform regeneration. When the vehicle decelerates and the vehicle speed becomes lower than the specific speed in the regenerative braking mode, the HCU 332 makes a transition to the engine stationary regeneration mode, in which a misfire is caused in the engine, the decompression device 225 is turned off, the engine 210 is stopped, and the motor 230 performs regeneration.

In the engine cranking mode (e.g., engine braking mode), so-called engine braking is performed.

Based on the input information, the HCU 332 determines whether to stop the engine 210 and drive the vehicle only via the motor 230, or to start the engine 210 and drive the vehicle via the engine power. The HCU 332 preferably starts the vehicle using the motor 230, unless the temperature is low or the remaining battery level is low.

When the vehicle is powered by the engine to run, the HCU 332 starts the engine 210 via the electric generator 270 and the motor 230, and at the same time, calculates the amount of energy required for the whole vehicle. Then, the HCU 332 calculates the most efficient operating condition for achieving production of the calculated amount of energy, sends a command to the engine control section 338, and controls the rotation of the electric generator 270 via the electricity control section 350 to achieve the engine speed corresponding to the operating condition.

The engine power is controlled by the HCU 332 based on the amount of power used to drive the vehicle directly and the amount of electricity used by the motor 230 to drive the vehicle, and depending on the charge state of the battery 400. The HCU 332 controls the operation of the vehicle using the engine 210, the motor 230 and the electric generator 270 such that the energy consumption of the whole vehicle is always the minimum possible, that is, the energy efficiency is always a maximum.

Specifically, when the vehicle has started running at a slow pace (e.g., is accelerating slowly from the stationary state) or is running at a low to medium speed (e.g., running steadily at a medium speed or lower) and the engine efficiency is low, the HCU 332 stops the engine 210 and drives the vehicle solely using the motor 230.

That is, when it is determined from the input accelerator opening information, vehicle speed information and brake information that the vehicle has started running at a slow pace or is running at a low to medium speed, the HCU 332 outputs an engine stop command to the engine control section 338 and a motor drive command to the electricity control section 350.

At this time, the motor drive command output from the HCU 332 requires the driving force to be produced by the motor 230 to correspond to the accelerator opening information. On receiving the motor drive command, the electricity control section 350 drives the motor 230 to rotate the rear wheel 107.

When the vehicle is running steadily, the HCU 332 drives the engine 210 to rotate the rear wheel 107 directly, and causes the engine 210 to drive the electric generator 270 so that the generated electricity can drive the motor 230 to rotate the rear wheel 107. That is, when it is determined from the input accelerator opening information, vehicle speed information and brake information that the vehicle is running steadily, the HCU 332 outputs a drive command to the engine control section 338 to drive the engine 210 and drives the motor 230 and the electric generator 270 via the electricity control section 350.

At this time, the engine power is split by the power distribution device 250 into two paths. The engine power through one path drives the electric generator 270, and the generated electricity drives the motor 230 to rotate the rear wheel 107. The engine power through the other path is transmitted to the axle 110 to rotate the rear wheel 107.

When the vehicle is running steadily and the driving force from the engine is transmitted through the two paths as described above, the HCU 332 controls the ratio of the engine powers transmitted through the two paths such that the efficiency of energy consumed by the whole vehicle can be maximized.

That is, when the engine 210 is operating, the HCU 332 controls the electricity generation output of the electric generator 270 such that the engine speed detected by the speed sensor 304 will not vary abruptly or greatly. In other words, the HCU 332 controls the electricity generation output of the electric generator 270 such that the emission and fuel consumption of the engine is small compared to conventional internal combustion engine vehicles. At the same time, the HCU 332 controls the electricity generation output of the electric generator 270, i.e. the engine speed, such that the remaining battery level of the battery 400 is always kept in a specific range, in other words, such that the driving of the motor 230 only causes variations of the remaining battery level of the battery 400 within a specific range.

When the vehicle is accelerating rapidly, the HCU 332 supplies, in addition to the driving force from the engine, electricity from the battery 400 to the motor 230, which transmits a drive force to drive the rear wheel 107.

That is, when it is determined from the input accelerator opening information, vehicle speed information and brake information that the vehicle is accelerating rapidly, the HCU 332 outputs an engine drive command to the engine control section 338 and a command to drive the motor 230 and the electric generator 270 to the electricity control section 350.

The HCU 332 also outputs a control command to supply electricity from the battery 400 to the motor 230 to the engine control section 338 and to the electricity control section 350.

In this way, when the vehicle is accelerating rapidly, the axle 110 is driven to rotate by the engine power transmitted via the power shaft 280 (see FIG. 2) and the driving force from the motor driven by the electricity supplied from the battery 400. Thus, the vehicle exhibits responsive and smooth motive performance and improved acceleration performance.

When the vehicle is decelerating or braking, the HCU 332 causes the rear wheel 107 to drive the motor 230. That is, when it is determined from the input information, in particular the brake information, that the vehicle is decelerating or braking, the HCU 332 outputs a motor regeneration command to the electricity control section 350 to cause the motor 230 to function as an electric generator so that the brake energy of the vehicle can be converted into more electricity.

That is, the HCU 332 can cause the motor 230 to function as a regenerative brake according to the brake information. The HCU 332 converts the regeneration output from the motor 230 from AC to DC using the electricity control section 350 and supplies the electricity collected by the motor 230 to the battery 400.

The HCU 332 performs control such that the battery 400 keeps a certain charge state, that is, such that variations in the remaining battery level of the battery 400 are small. When the charge amount of the battery 400 has become small, the HCU 332 starts charging the battery 400 by starting up the engine 210 and driving the electric generator 270. The HCU 332 controls the operation of the vehicle based on the remaining battery level information input from the remaining battery level sensor 307, in addition to the input accelerator opening information, vehicle speed information and brake information.

For example, when the battery 400 alone cannot afford to supply sufficient electricity to the motor 230 or when the input information indicates that the remaining battery level of the battery 400 has reached a specific level or lower, the HCU 332 starts the engine 210 via the engine control section 338. That is, the HCU 332 starts the engine 210 by sending a start signal to an ignition 222 via the engine control section 338 to charge the battery 400.

When the electricity supplied from the electric generator 270 to the battery 400 is more than a specific amount, the HCU 332 controls the output of the engine 210 via the engine control section 338 to reduce the electricity generated by the electric generator 270. Alternatively, the HCU 332 may stop driving the electric generator 270 to stop the supply of electricity to the battery 400, or may supply the electricity from the electric generator 270 to the motor 230, instead of the battery.

When the vehicle is stationary, the HCU 332 stops the engine 210 automatically. That is, when it is determined from the input accelerator opening information, vehicle speed information and brake information that the vehicle is stationary, the HCU 332 outputs an engine drive stop command to the engine control section 338 to stop the engine.

The electricity control section 350 controls the current path based on motor drive information including motor torque information and the motor current information input from the HCU 332, and controls the driving of the motor 230. The motor 230 includes an inverter 230a. The inverter 230a converts the discharge output of the battery 400 input to the motor 230 via the electricity control section 350 from DC to AC, and converts the regeneration output of the motor 230 from AC to DC to output it to the electricity control section 350.

The electricity control section 350 also controls the current path based on electric generator drive information, including the rotational speed information of the electric generator 270 input from the HCU 332, and controls the driving and stopping of the electric generator 270. The electric generator 270 includes an inverter 270a. The inverter 270a converts the generation output of the electric generator 270 from AC to DC to output it to the electricity control section 350, and converts the current input to the electric generator 270 from DC to AC.

Specifically, the electricity control section 350 supplies the discharge current from the battery 400 to the motor 230 and supplies the electricity generated by the electric generator 270 to the battery 400 and the motor 230 based on the output signal from the HCU 332. In addition, based on the output signal from the HCU 332, the electricity control section 350 supplies the regeneration output of the motor 230 to the battery.

The output signal from the HCU 332 to be input to the electricity control section 350 is based on the information input from the detection sections 301 to 303 and the sensors 304 to 311 to the HCU 332.

Thus, the electricity control section 350 responds to accelerator and brake operations by the vehicle operator, and controls the operation with reference to the rotational speed of the motor 230 such that the output torque of the motor 230 is in accordance with the accelerator and brake operations.

The engine control section 338 controls the operation of the engine 210 based on engine drive information input from the HCU 332, including the engine drive command, the engine stop command, and a throttle valve opening command, an engine ignition operation command, etc. issued when the engine is being driven.

Specifically, the engine control section 338 controls the operation of the ignition (indicated as "IGN." in FIG. 4) 222, the throttle valve (indicated as "THB." in FIG. 4) 223, an injector (indicated as "INJ." in FIG. 4) 224, and a decompression device (indicated as "DECOMP." in FIG. 4) 225.

The engine control section 338 can drive the rear wheel 107 to rotate, both by driving the engine 210 directly and by driving the motor 230 via the power distribution device 250 and the electric generator 270. The engine control section 338 can also control the driving of the engine 210 to supply electricity generated by the electric generator 270 to the battery 400.

The ignition 222, the throttle valve 223 and the injector 224 operate respectively in response to an ignition command, a throttle opening command, a fuel supply command, etc. input via the engine control section 338.

The decompression device 225 is controlled electronically. The decompression device 225 is turned on based on the information input from the engine control section 338 to reduce the in-cylinder pressure when the engine is on the compression stroke. That is, the decompression device 225 opens an exhaust valve of the engine 210 to reduce the in-cylinder pressure during the compression stroke.

Since the decompression device 225 is actuated by an electronically controlled component which does not use engine hydraulic pressure, such as an electronic solenoid valve, the decompression device 225 can quickly respond to the input information to reduce the in-cylinder compression pressure, compared to the construction where hydraulic pressure is used.

The decompression device 225 is turned on based on the input information to reduce the in-cylinder compression pressure from the moment when the cranking of the engine is started. Since actuation of the decompression device 225 is controlled electronically, such as by an electronic solenoid valve openable by a magnetic force generated by energizing a coil, and thus does not use engine hydraulic pressure as a drive medium, the decompression device 225 can be driven regardless of whether the engine 210 is operating or stationary.

The battery 400 is electrically connected via the electricity control section 350 to the electric generator 270. The battery 400 supplies electricity to the motor 230, which is used to drive the motor 230, and the battery 400 stores electricity generated by the motor 230 and the electric generator 270.

In the control device 300 for a hybrid vehicle, when the engine 210 is started up, the HCU 332 increases the rotational speed of the engine 210 until it exceeds a predetermined resonance point X (see FIG. 7) while reducing the compression pressure in the cylinders 212 via the decompression device 225. When the engine speed has exceeded the resonance point and become proper for engine startup, the decompression device 225 is turned off and ignition is made to start up the engine 210.

To stop the engine 210 while the vehicle is running, the HCU 332 determines whether or not to stop the engine 210 based on the accelerator opening information, the vehicle speed information, the brake information, etc. If the engine 210 is to be stopped, it is stopped as the decompression device 225 is turned on and the compression pressure inside the cylinder 212 is reduced.

If the engine 210 is not to be stopped but to be braked, the HCU 332 cranks the engine 210 with its ignition cut off. At this time, the HCU 332 turns on the decompression device 225 and rotates the motor 230 for regenerative braking, or turns off the decompression device 225 for engine crank braking using the engine 210.

In this way, the driving of the drive unit 200, specifically the driving of the engine 210, the electric generator 270 and the motor 230, is controlled by the HCU 332. The engine stop operation performed by the HCU 332 using the drive unit 200 is described in detail along with the control unit incorporating the HCU 332.

Figure 5:
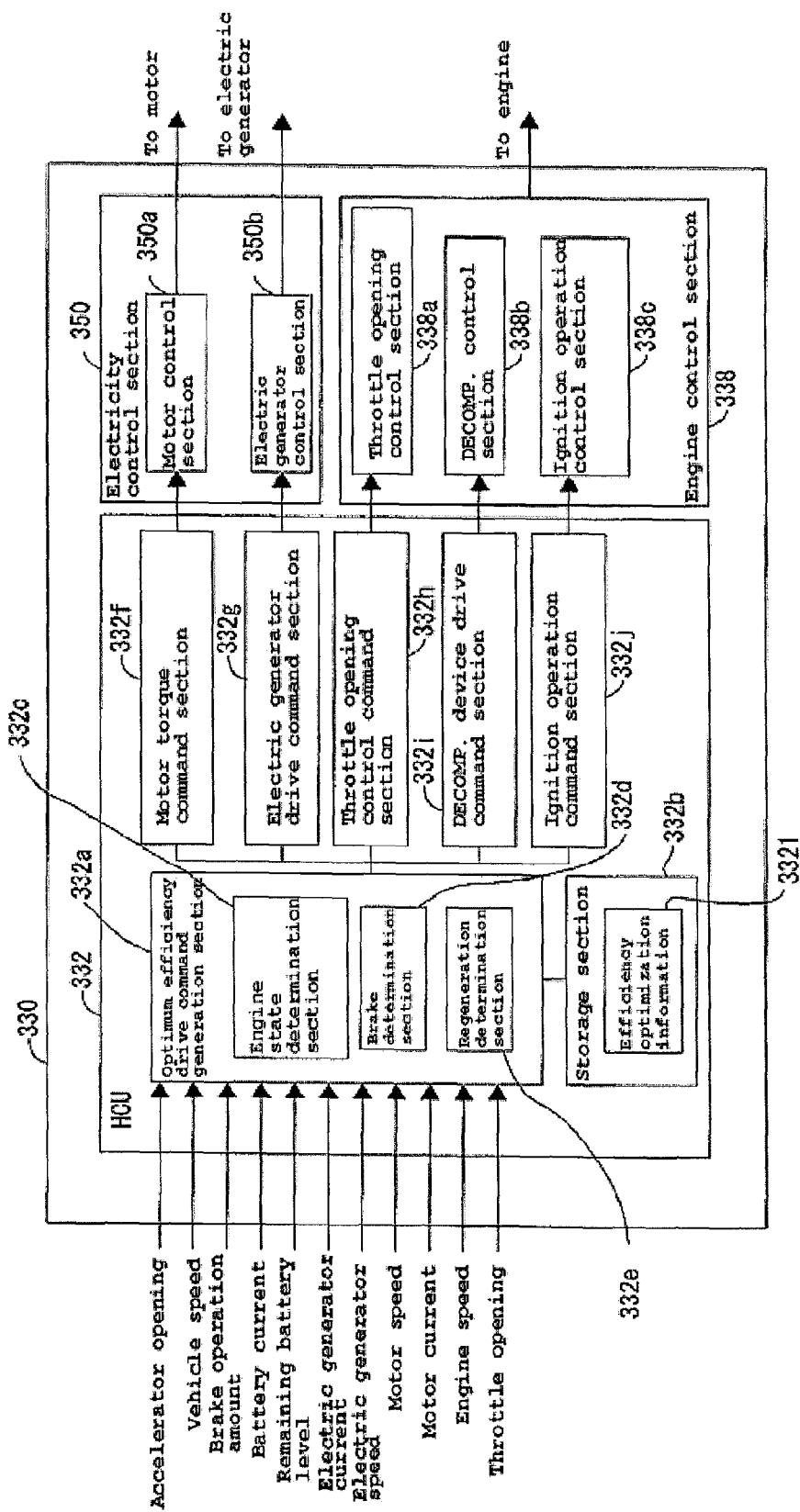
FIG. 5 is a functional block diagram of a control unit outlining the functions of a hybrid control unit (HCU) related to engine stop.

FIG. 5 is a functional block diagram of the control unit for explaining the functions of the HCU 332 related to engine drive. Hereinafter, in particular, the functions of the control device 300 related to engine stop are described.

As shown in FIG. 5, the HCU 332 includes an efficiency optimization drive command generation section (hereinafter referred to as "command generation section") 332a, a storage section 332b, and various command sections 332f to 332j.

The command generation section 332a generates command information for driving the drive unit 200 itself based on the various information input to the HCU 332 and the information stored in the storage section 332b. That is, the command generation section 332a generates drive command information (efficiency optimization drive command information) for driving the engine 210, the motor 230 and the electric generator 270 such that the vehicle can be driven with highest energy efficiency, and outputs the generated information to the command sections 332f to 332j.

In particular, if the engine 210 is to be stopped, the command generation section 332a generates drive command information based on the vehicle speed information from the vehicle speed detection section 302 (see FIG. 4), the accelerator opening information from the accelerator opening detection section 301 (see FIG. 4), efficiency optimization information 3321 in the storage section 332b, and determination information from an engine state determination section 332c, a brake operation determination section 332d and a regeneration operation determination section 332e. The brake operation determination section 332d and the regeneration operation determination section 332e are hereinafter referred to as brake determination section 332d and regeneration determination section 332e, respectively.

Specifically, the drive command information includes information such as the motor current for controlling the operation of the motor 230, the electric generator speed and current for controlling the electric generator 270, the throttle opening for controlling the engine 210, the cycling (on and off) of the decompression device, the ignition and misfire operation, etc.

The storage section 332b stores parameters used to drive the hybrid vehicle, specifically to drive the drive unit 200 with optimum energy efficiency, by the HCU 332. Here, in particular, parameters used in the engine stop process are described.

The storage section 332b stores, for example, the efficiency optimization information 3321 for controlling the drive unit 200 so as to drive it with highest efficiency, resonance information (resonance rotational speed) of the engine in the drive unit 200, etc.

Figure 6:
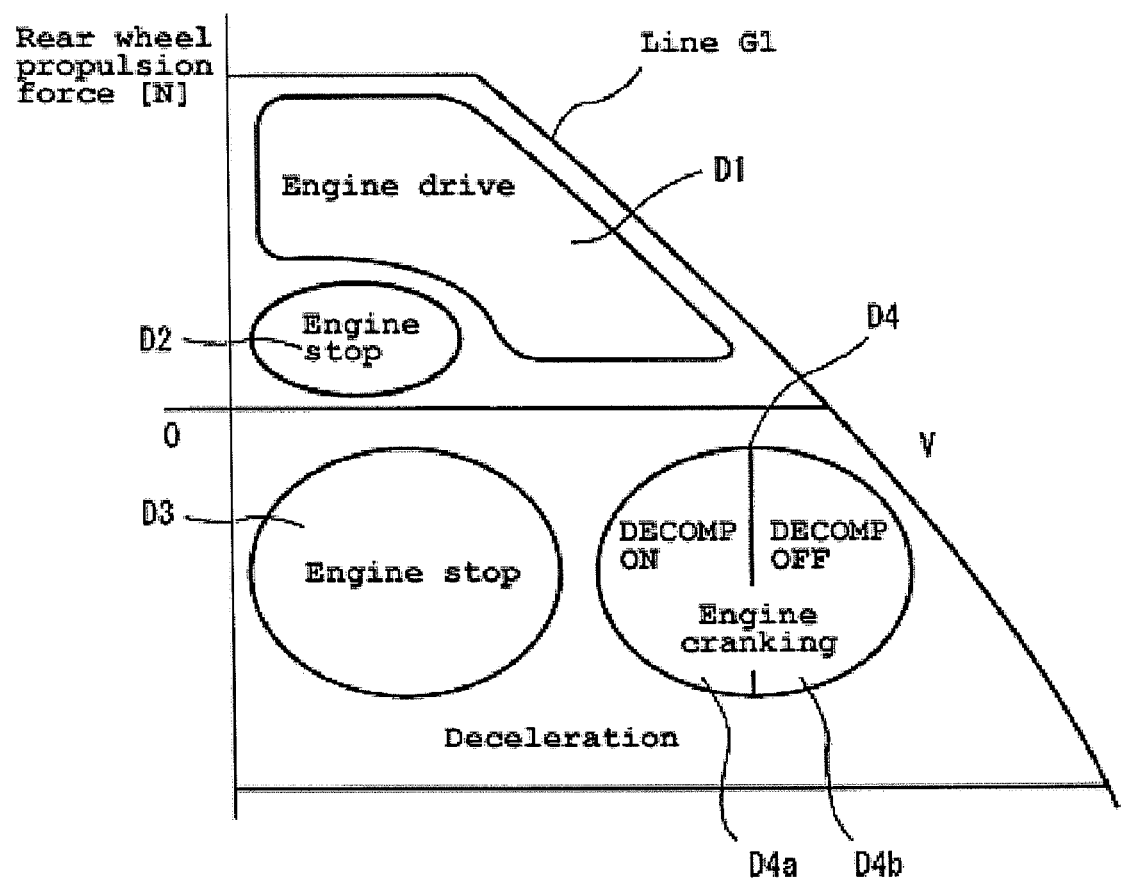
FIG. 6 is a diagram illustrating an example of efficiency optimization information.

FIG. 6 is a diagram illustrating an example of the efficiency optimization information 3321.

The efficiency optimization information 3321 shown in FIG. 6 is in the form of a conceptual map showing engine states for achieving operating states where energy use efficiency is most preferable in the scooter-type motorcycle 100 incorporating the hybrid driving device 300.

In FIG. 6, the vertical axis represents rear wheel propulsion force, the horizontal axis represents vehicle speed, and a line G1 represents driving force achieved by the motor at maximum output plus the engine driven directly. Regions D1 to D4 shown in FIG. 6 represent engine states for achieving operating states where the highest energy efficiency can be achieved.

In the region D1, the engine 210 is driven and the battery 400 may be discharged (SOC−), neither charged nor discharged, or charged (SOC+). In the region D2, the engine 210 is stopped and the rear wheel 107 is driven by electricity from the battery 400 via the motor 230 (SOC−) to achieve the highest energy efficiency.

In the region D2, the load imposed on the drive unit 200 ranges approximately from 0% to a specific percentage (for example, 23%) of the engine output, and the energy efficiency can be optimized with the engine 210 stopped. Also, in the region D2, a hysteresis is provided for engine output control in order to avoid frequent startup and stopping of the engine 210. For battery output control in the region D2, the vehicle runs only on the battery output, and the battery output efficiency is preferably equivalent to about 150% of the net fuel consumption rate of the engine.

The regions D3 and D4 correspond to engine states during deceleration. In the region D3, combustion is not caused in the engine 210 with ignition cut off, the decompression device 225 is driven, and cranking is stopped.

In the region D4, combustion is not caused in the engine 210 with ignition cut off, and cranking is performed. The region D4 has a region D4a in which the decompression device 225 is driven to reduce the pressure inside the cylinder in order to use the motor 230 for regenerative braking. The region D4 also has a region D4b in which no decompression occurs, but cranking is performed in order to use the engine 210 for engine braking, i.e. crank braking. In the region D4, either one of the regions D4a and D4b is selected depending on the state of the battery 400 (storage battery).

Based on the information stored in the storage section 332b, including the efficiency optimization information 3321, and the input information, the command generation section 332a generates a basic control command value for the drive unit 200. Since torque proportional to the indication of the accelerator opening information used in the HCU 332 is applied to the rear wheel 107, the accelerator opening information can be replaced by rear wheel propulsion force in the efficiency optimization information 3321.

The command generation section 332a includes an engine state determination section 332c for setting an engine state where the energy efficiency is optimum, a brake determination section 332d for determining brake operation, and a regeneration determination section 332e for determining regeneration operation.

The engine state determination section 332c sets the operating state of the engine 210 based on the vehicle speed information from the vehicle speed detection section 302 (see FIG. 4), the accelerator opening information from the accelerator opening detection section 301 (see FIG. 4), brake operation information from the brake detection section 303, and the information in the storage section 332b.

More specifically, the engine state determination section 332c reads efficiency optimization information from the vehicle speed information and the accelerator opening information, and determines command values for the engine 210, the electric generator 270 and the motor 230 to bring the engine 210 to a driven state or a stationary state. When the engine state determination section 332c determines to bring the engine 210 to a driven state, the engine state determination section 332c outputs command values based on the efficiency optimization information to the command sections 332f to 332j and outputs the determination result to the brake determination section 332d. Even when the energy efficiency is high, when the remaining battery level of the battery 400 input from the remaining battery level sensor 307 is higher than a specific value, the engine state determination section 332c determines to stop the engine 210.

In response to the determination result from the engine state determination section 332c to bring the engine to a driven state, the brake determination section 332d determines whether or not brake operation is being performed based on the input accelerator opening information, vehicle speed information and brake operation information. Specifically, the brake determination section 332d determines whether or not the rear wheel torque command value based on the accelerator opening information, the vehicle speed information and the brake operation information is smaller than 0, and if smaller than 0, determines that brake operation such as by operation of a brake lever is being performed.

In response to the determination result by the brake determination section 332d that brake operation is being performed, when the remaining battery information indicates a battery state allowing the motor 230 to perform regeneration during the brake operation, the regeneration determination section 332e determines that there is a motor regeneration command value and outputs the determination result. The motor regeneration command value commands the motor 230 to perform regeneration through rotation of the driving wheel 107 in controlled operation, without causing combustion in the engine 210. In response to the motor regeneration command value, either one of the two regeneration braking modes, or the cranking regeneration mode (first regeneration mode) and the engine stationary regeneration mode (second regeneration mode), is performed.

Specifically, the determination by the regeneration determination section 332e is made when the input information and the region D4 in the optimization information 3321 indicate that braking operation is being performed and that it is still too early to stop the engine 210 in consideration of vehicle speed (e.g., the vehicle speed is not yet proper for engine stop). During the brake operation, the regeneration determination section 332e monitors the remaining battery level (SOC) of the battery 400, and when the battery remaining level is lower than a specific value, determines that there is a regeneration command and outputs the determination result.

During the brake operation, the regeneration determination section 332e monitors the input vehicle speed, and when the vehicle speed is a specific speed (at which the engine 210 cannot be stopped) or higher, outputs a determination result to effect the cranking regeneration mode, and when the vehicle speed is lower than the specific speed, outputs a determination result to effect the engine stationary regeneration mode.

On the other hand, when the remaining battery level is higher than a specific value, the regeneration determination section 332e determines that the battery 400 could not store electricity to be regenerated by the motor 230, that is, that there is no regeneration command, and outputs the determination result.

The command generation section 332a generates driving force command information based on the determination result from the regeneration determination section 332e, and outputs the generated information via the command sections 332f to 332j to control the motor 230, the electric generator 270, the engine 210, etc.

When the regeneration determination section 332e outputs a determination result that there is a regeneration command, the command generation section 332a generates regenerative braking mode drive information. Also, when the regeneration determination section 332e outputs a determination result that there is no regeneration command, the command generation section 332a generates engine crank braking (hereinafter referred to as "crank braking") mode drive information.

The regenerative braking mode drive information commands generation of a current command value, with the opposite sign from that generated while driving, to be provided to the motor 230 in order to achieve a target deceleration rate, so that the motor 230 can perform regeneration (region D4a of FIG. 6).

The regenerative braking mode drive information includes cranking regeneration mode drive information and engine stationary regeneration mode drive information, as indicated above.

When generating the cranking regeneration mode drive information, the command generation section 332a generates command values to close the throttle valve fully, cut off ignition and fuel, and turn on the decompression device 225 so that pumping loss can be minimized and the regenerative braking efficiency can be increased.

When generating the engine stationary regeneration mode drive information, the command generation section 332a generates command values to open the throttle valve fully, cut off ignition and fuel, and turn off the decompression device 225 so that regenerative braking with increased pumping loss can be performed.

The crank braking mode drive information is generated when the battery 400 is in a saturated state such as charged fully, overcharged, etc. and thus could not store electricity to be regenerated by the motor 230 (region D4b of FIG. 6).

That is, the crank braking mode drive is to cancel engine braking by regeneration (regenerative braking mode) and switch to engine braking by engine pumping (crank braking mode) when it is expected that regenerative energy will make the battery level exceed a certain criterion (specific value) to overcharge the battery 400. In order to avoid shock, which would occur when the braking mode is switched, the maximum value for engine braking by regeneration is preferably preset in agreement with engine braking determined by the engine pumping loss with the decompression device 225 unused and the power distribution device 250.

In the crank braking mode drive, the command generation section 332a generates command information to open the throttle valve fully, cut off ignition and fuel, and turn off the decompression device 225 so that pumping loss can be maximized, without reducing the compression pressure inside the cylinder, and braking by cranking (crank braking) can be performed.

Also, the command generation section 332a reads the resonance rotational speed X set for the constitution of the drive unit 200 from the storage section 332b as a parameter of timing at which the decompression device 225 is turned on when stopping the engine (in the engine stationary mode).

Further, in order to control the motor, the command generation section 332a generates motor current control command information for controlling the motor current and motor torque control command information.

In addition, the command generation section 332a generates a command to control engine ignition operation performed by the ignition (see FIG. 4) 222 at specific timing, and command information for controlling misfire operation.

In particular, when controlling engine stop, the command generation section 332a generates various control command information such as on the driving of the decompression device, throttle opening operation, electric generator speed and current, motor current, etc., based on the vehicle speed information, the accelerator opening information and the brake operation information.

The drive command information generated by the command generation section 332a such as on the motor current, the electric generator speed and current, the throttle opening, the driving (on and off) of the decompression device, the ignition operation, etc. is output to the command sections 332f to 332j. The information is output via the command sections 332f to 332j to the electricity control section 350 and the engine control section 338 as drive information.

A motor torque command section 332f outputs a command related to motor drive control, for example a motor current control command, among the drive commands generated by the command generation section 332a, to the electricity control section 350 as motor drive information.

The electric generator drive command section 332g outputs a command related to electric generator drive control, for example an electric generator speed control command and an electric generator current control command, among the drive commands generated by the command generation section 332a, to the electricity control section 350 as electric generator drive information.

The throttle opening control command section 332h outputs a control command related to throttle opening, among the commands related to engine drive control generated by the drive command generation section 332a, to the engine control section 338 as engine drive information.

The decompression device drive command section 332i outputs a control command related to the driving of the decompression device, among the command information related to engine drive control generated by the drive command generation section 332a, to the engine control section 338 as engine drive information.

The ignition operation command section 332j outputs a control command related to ignition operation, which includes ignition operation and misfire operation, among the commands related to engine drive control generated by the drive command generation section 332a, to the engine control section 338 as engine drive information.

In the electricity control section 350, a motor control section 350a and an electric generator control section 350b respectively control the motor 230 and the electric generator 270 based on the output signal from the HCU 332, specifically the information input from the motor torque command section 332f and the electric generator drive command section 332g.

That is, the motor control section 350a and the electric generator control section 350b supply the discharge current from the battery 400 to the motor 230 and supply the electricity generated by the electric generator 270 to the battery 400 and the motor 230 based on the input drive command information. In addition, the motor control section 350a and the electric generator control section 350b supply the regeneration output of the motor 230 to the battery 400 based on the information input from the motor torque command section 332f and the electric generator drive command section 332g.

The engine control section 338 includes a throttle opening control section 338a for controlling the opening of the throttle valve 223, a decompression device control section 338b for controlling the driving of the decompression device 225, and an ignition operation control section 338c for controlling the driving of the ignition 222 and the injector 224.

The control sections 338a to 338c control the throttle valve 223, the decompression device 225, and the ignition 222 and the injector 224 based on the drive information input from the HCU 332, specifically the drive command information from the command sections 332h to 332j, respectively.

The operation at engine stop of the control device 300 as described above is described in detail with reference to FIGS. 7 and 8.

Figure 7:
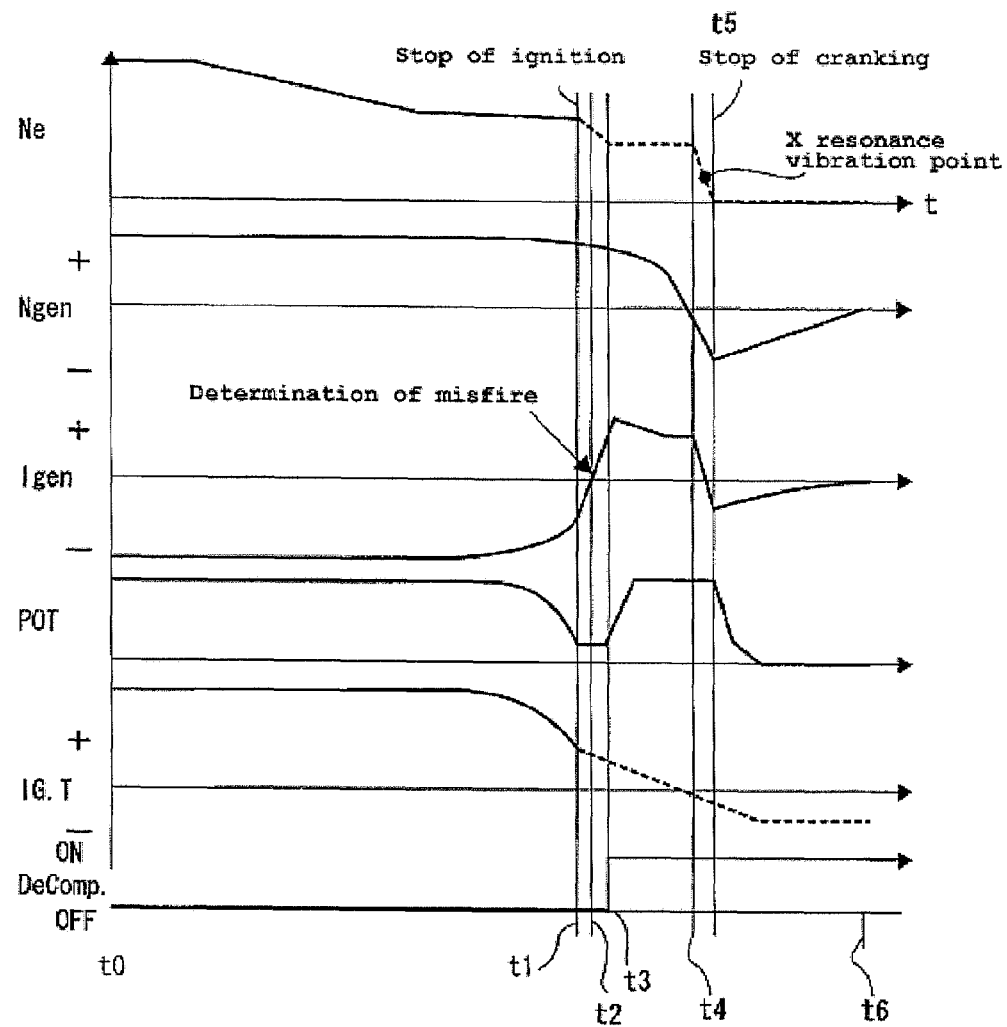
FIG. 7 is a timing chart illustrating an engine stop control process using the control device for a hybrid vehicle according to one embodiment of the present invention.

FIG. 7 is a timing chart for explaining the engine stop control process by the control device 300 for a hybrid vehicle according to one embodiment. In FIG. 7, "Ne" denotes engine speed, "Ngen" electric generator speed, and "Igen" electric generator current. Also, in FIG. 7, "POT (Part Of Throttle)" denotes throttle opening, "IG.T" ignition timing, and "DeComp" the decompression device.

On the graph of the engine speed "Ne" shown in FIG. 7, the dotted portion from timing t1 to timing t6 shows the rotational speed of the engine as being driven by the electric generator 270 used as a starter motor with ignition of the engine 210 stopped (e.g., misfire state).

In order to stop the engine 210 from a state where the vehicle is running with the engine 210 rotating with combustion (t0 to t1), the control device 300, specifically the HCU 332, performs processes at timings as shown in FIG. 7 and described below. FIG. 8 is a flowchart for explaining the engine stop control process.

Figure 8:
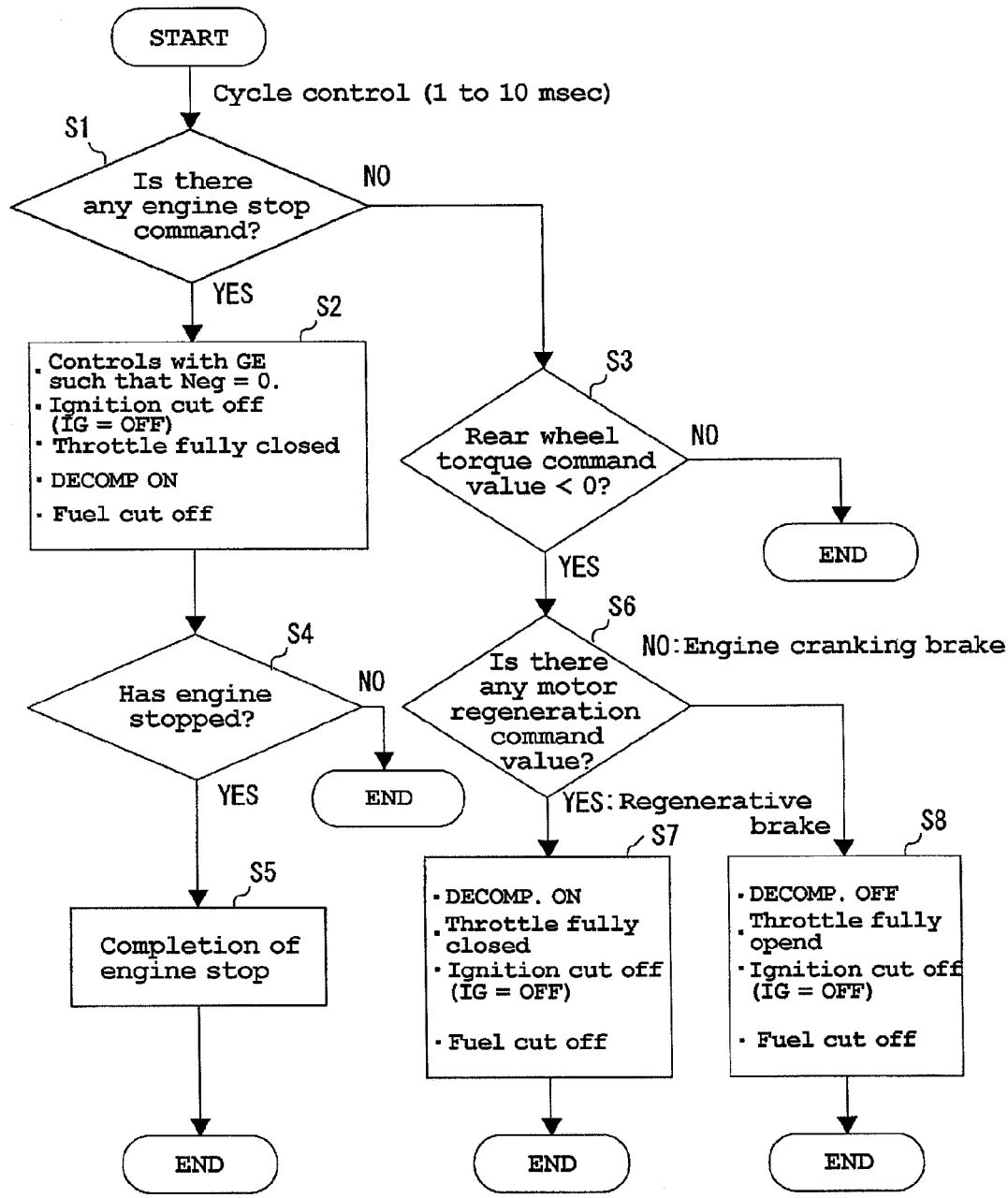
FIG. 8 is a flowchart outlining the engine stop control process.

When the vehicle is running with the engine 210 rotating with combustion (t0 to t1 in FIG. 7), the HCU 332 performs the process of step S1 shown in FIG. 8.

In step S1, the command generation section 332a (engine state determination section 332c) determines whether or not a most efficient operating state is achieved in a state where the engine 210 is stationary based on the input vehicle speed, accelerator opening, and efficiency optimization information for the whole system of the scooter-type motorcycle 100.

Specifically, it is determined whether or not there is a stop command for the engine 210 generated in the engine state determination section 332c. The process proceeds to step S2 if there is a stop command in step S1, that is, the engine 210 is to be stopped, and to step S3 if there is no stop command, that is, the engine 210 is not to be stopped.

The determination as to whether or not to stop the engine is made to achieve highest efficiency for the whole system, and made regularly (e.g., 1 to 10 ms) when the scooter-type motorcycle 100 incorporating the system is being driven. The operating states of the engine 210, the electric generator 270 and the motor 230 in step S1 can be indicated, for example, between the collinear lines K1 and K2 in FIG. 3.

In step S2, the HCU 332 turns on the decompression device 225 to reduce the compression pressure inside the cylinder 212, closes the throttle valve fully, cuts off ignition and fuel, and controls "Neg" to 0 through the electric generator 270, to proceed to step S4.

Specifically, in step S2, the command generation section 332a generates a drive command to close the throttle valve fully, cut off ignition by the ignition and fuel to the injector (not shown) and a drive command for the electric generator 270 to control the engine speed (Neg) to 0 in response to the determination by the engine state determination section 332c to stop the engine, and outputs the generated drive commands to the decompression device drive command section 332i, the throttle opening control command section 332h and the electric generator drive command section 332g.

Upon receiving the drive command, the command sections 332i, 332h and 332g output a drive command to the engine control section 338 and the electricity control section 350 to control the driving of the decompression device 225, the throttle valve 223 and the electric generator 270.

In step S4, it is determined whether or not the engine has stopped based on the rotational speed and current of the electric generator 270. If the engine has stopped, the process proceeds to step S5 for completion of engine stop, and if not, the process is ended. In step S4, the HCU 332 keeps the decompression device 225 on until the engine speed exceeds the resonance rotational speed stored in the storage section 332b. After the engine stop process is ended, cycle control starts the process again from the engine stop determination step S1 at regular intervals of 1 to 10 ms.

On the other hand, after it is determined that there is no engine stop command in step S1, the HCU 332 determines in step S3 whether or not the rear wheel torque command value determined based on the input accelerator opening information and vehicle speed information is smaller than 0. The process proceeds to step S6 if the value is smaller than 0, and if not, the stop process is ended. After the engine stop process is ended, cycle control starts the process again from the engine stop determination step S1 at regular intervals of 1 to 10 ms.

Specifically, in the process of step S3, the brake determination section 332d determines whether or not brake operation is being performed, that is, whether or not the vehicle is decelerating, by determining the rear wheel torque command value based on the input accelerator opening, vehicle speed and brake operation. Based on the determination result, the command generation section 332a generates and outputs drive commands to the corresponding command sections.

In step S6, the HCU 332 determines whether or not there is a motor regeneration command value for the motor 230 to perform regeneration through rotation of the rear wheel (driving wheel) 107, without causing combustion in the engine 210, based on the input remaining battery level. If there is a motor regeneration command value in step S6, the process proceeds to step S7 to effect the regenerative braking mode, and if not, to step S8 to effect the crank braking mode.

Specifically, in step S6, in response to the determination result by the brake determination section 332d that brake operation is being performed, the regeneration determination section 332e determines whether or not there is a regeneration command for the motor 230 generated based on the remaining battery level and the region D4 in the optimization information 3321. The regeneration determination section 332e monitors the remaining battery level (SOC) of the battery 400, and when the battery remaining level is lower than a specific value, generates a regeneration command value, determines that there is a regeneration command, and outputs the determination result.

On the other hand, when the remaining battery level is higher than the specific value, the regeneration determination section 332e determines that the battery 400 could not store electricity to be generated by regeneration of the motor 230, determines that there is no regeneration command, and outputs the determination result.

In step S7, where the regenerative braking mode is effected, the HCU 332 turns on the decompression device 225 to reduce the compression pressure inside the cylinder 212, and generates drive commands such as to close the throttle valve fully, cut off ignition and fuel, etc., to end the process. After the process is ended, cycle control starts the process again from the engine stop determination step S1 at regular intervals of 1 to 10 ms.

Specifically, in step S7, the regeneration determination section 332e generates a current command value, with the opposite sign from that generated while driving, to be provided to the motor 230 in order to achieve a target deceleration rate without causing combustion in the engine 210, based on the region D4 in the optimization information 3321 shown in FIG. 6. At the same time, the command generation section 332a generates a command for the engine 210 to close the throttle valve fully, cut off ignition and fuel, and turn on the decompression device 225.

In particular, by driving (turning on) the decompression device 225 when the crankshaft 211 (see FIG. 2) is rotating, the compression pressure inside the cylinder 212 (see FIG. 2) can be reduced so that the rotational torque of the crankshaft can be decreased compared to the case where the compression pressure is not reduced. Thus, it is possible to minimize pumping loss in the engine 210, transmit the torque of the rear wheel 107 to the motor 230 efficiently, and improve the energy efficiency of regeneration of the motor 230 and the efficiency of regenerative braking.

In step S8, where the crank braking mode is effected, the HCU 332 turns off the decompression device 225, and generates drive commands such as to open the throttle valve fully, cut off ignition and fuel, etc., to end the process. After the engine stop process is ended, cycle control starts the process again from the engine stop determination step S1 at regular intervals of 1 to 10 ms.

Specifically, the process of step S8 is performed when the regeneration determination section 332e determines that the regenerative braking process should be performed but that electricity to be generated by motor regeneration could not be stored because the battery 400 which should store the regenerated electricity is charged fully (overcharged), etc. (region D4b of FIG. 6). At this time, the command generation section 332a generates drive commands to open the throttle valve fully, cut off ignition and fuel, and turn off the decompression device 225, and outputs the generated drive commands to the command sections 332h to 332j for drive control through the engine control section 338.

In this way, in the engine 210 cranked with no combustion caused therein, the torque of the rear wheel 107 causes the crankshaft 211 (see FIG. 2) to rotate (perform cranking) without the compression pressure inside the cylinder 212 (see FIG. 2) being reduced. That is, pumping loss in the engine 210 can be maximized for crank braking.

The characteristics of the electric generator 270 in the engine stop process as described above are shown in FIG. 9.

Figure 9:
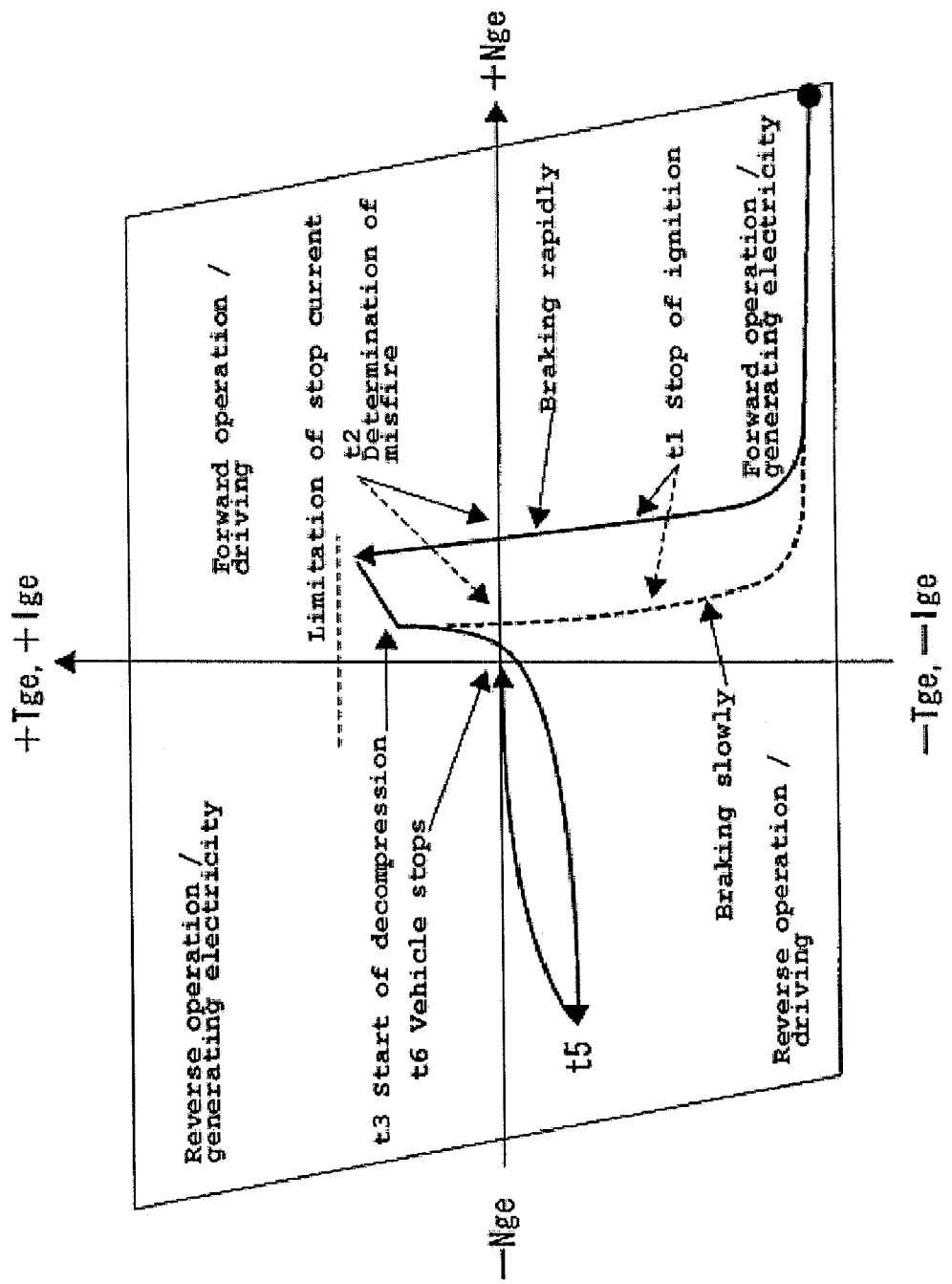
FIG. 9 is a diagram showing electric generator characteristics for explaining the process of stopping the engine from a vehicle running state performed by the driving device of this embodiment.

FIG. 9 is a diagram showing electric generator characteristics for explaining the process of stopping the engine from a vehicle running state performed by the driving device of this embodiment. FIG. 9 shows the relationship between the rotational speed and current (equivalent to torque) of the electric generator in the engine stop process, with "Tge" and "Ige" in the vertical axis representing electric generator torque and current, respectively, and "Nge" representing electric generator speed. Two patterns of characteristics are shown in FIG. 9, in which engine stop is achieved by rapid braking and slow braking. Timings t1 to t3, t5 and t6 in FIG. 9 respectively correspond to the timings t1 to t3, t5 and t6 in FIG. 7.

As shown in FIG. 7, in the scooter-type motorcycle 100 of this embodiment, the HCU 332 stops ignition at the timing t1. After a misfire determination is made at the timing t2, at the timing t3 when the current of the electric generator 270 reaches a current limit for a stop, the decompression device 225 (see FIG. 4) is driven to start reducing the compression pressure inside the cylinder 212 (see FIG. 2). The HCU 332 keeps the pressure reducing operation by the decompression device 225 through the timing t4 at which the rotation of the electric generator 270 is reversed, the timing t5 at which the rotational speed of the engine 210 falls below the resonance rotational speed X and the rotation of the crankshaft is stopped, and the timing t6 at which the rotational speed of the electric generator 270 becomes 0.

A motorcycle incorporating a conventional typical hybrid drive unit and the scooter-type motorcycle 100 as a hybrid vehicle of this embodiment are compared to describe their differences.

In general, when a hybrid drive unit is mounted on a motorcycle, the expected functions of the hybrid drive unit includes converting deceleration energy into electric energy (regenerative energy) through an electric power transmission system during deceleration to improve the system efficiency. The conversion into regenerative energy during deceleration, i.e. regenerative braking, is preferably achieved as proper engine braking similar to that achieved with conventional engine-driven motorcycles. However, motorcycles have a serious limitation on the capacity of a battery mounted thereon in view of mounting space and cost, and thus have difficulty in incorporating a battery of a sufficient size to store large regenerative energy for an extended period.

To maximize regenerative energy, in the speed range where the engine can be stopped, it is preferable to stop the engine to reduce pumping loss. However, shock occurs when the engine is caused to rotate and stop, which makes it difficult to achieve proper engine braking similar to that achieved with the conventional motorcycles.

In contrast, according to the control device 300 of the scooter-type motorcycle 100 of this embodiment constituted as described above, when the battery level is increased by regenerative energy to exceed a certain criterion and the battery 400 is expected to be overcharged, regenerative braking is canceled and a switch is made to crank braking by engine pumping. Shock can be avoided at the switch between braking modes, because the maximum value for regenerative braking is preset in agreement with crank braking determined by engine pumping loss with the decompression device unused and the planet gears.

In the case of motorcycles incorporating a typical hybrid drive unit, the engine is not stopped while the vehicle is running in order to avoid shock which would occur when the engine is caused to rotate and stop. In the state where the engine is not stopped while the vehicle is running, that is, cranking is performed regardless of whether or not combustion is caused, the compression pressure in the cylinder creates compression resistance at cranking, which creates engine pumping loss when motor regeneration is performed using the torque of the rear wheel.

In contrast, in the scooter-type motorcycle 100 of this embodiment, when the brake operation is performed while the vehicle is running without stopping the engine, the decompression device 225 is driven, which can reduce engine pumping loss and suppress decrease in the amount of regenerative energy.

With this constitution, the battery capacity can be reduced so that the hybrid drive unit having the power distribution device can be mounted on a motorcycle with a limited mounting space. Also, the hybrid motorcycles can achieve engine braking similar to that achieved with the conventional motorcycles and suppress decrease in regenerative energy.

Also, according to this embodiment, in the scooter-type motorcycle 100 having the power distribution device 250, the engine 210 is controlled along with the electric generator 270 and the motor 230, and when the engine 210 is to be stopped, the decompression device 225 is driven to reduce the compression pressure inside the cylinder 212 while cranking is performed. In this way, in the scooter-type motorcycle 100, cranking torque of the crankshaft 211 of the engine 210, which changes abruptly after engine misfire and before the engine is stopped completely, can be decreased.

Thus, impact at engine stop can be reduced without increasing the capacity of the battery 400 for supplying a current to the motor 230, or increasing the size of the motor 230 itself to increase the torque produced by the motor 230.

That is, the device is mountable on a vehicle such as a motorcycle which has a limited mounting space compared to an automobile and thus cannot secure a space for a battery which increases as its charging capacity increases. The device can lessen the impact at engine stop, or an increase and decrease in propulsion force not intended by an operator, thereby allowing the operator to perform proper operation.

In this embodiment, the HCU 332 generates a command to drive the motor 230, the electric generator 270 and the engine 210, and outputs the generated command to the electricity control section 350 and the engine control section 338, which should not be construed as a limitation. Alternatively, the electricity control section 350 and the engine control section 338 may have the function of the HCU 332, or other plural control devices may have the function of the HCU 332.

The engine 210 is stopped while the decompression device 225 is driven to reduce the compression pressure inside the cylinder 212 while cranking is performed. At this time, cranking is performed with no combustion caused in the engine 210.

That is, the operating state of the engine 210 can be transitioned from braking to a complete stop (with engine drive and cranking stopped) without impact due to motion of the crankshaft occurring in the engine 210 without combustion and in a misfire state.

This allows quick completion of transition during braking from regeneration operating state and engine braking state in which the pressure reducing operation by the decompression device 225 is stopped to engine complete stop operating state. In other words, transition of operating states of the engine 210 can be completed in a short period when braking the engine 210, and electricity regeneration by the motor 230 can be started as early as possible. Thus, stable braking force can be obtained and the running stability can be improved. The command generation section 332a controls the engine 210, the motor 230, the electric generator 270 and the battery 400 such that an operating state with highest energy efficiency can be achieved and the fuel efficiency can be improved.

The maximum value for regenerative braking at transition from regeneration operating state, i.e. regenerative braking operating state, to engine braking state is set in agreement with engine braking in the crank braking mode (engine braking mode). That is, the deceleration rate in the regenerative braking state and that in the engine braking state are in agreement with each other. Thus, impact at a switch from regenerative braking to engine braking can be reduced.

In the scooter-type motorcycle 100 of this embodiment as described above, the driving device 300 is mounted on a vehicle with a limited mounting space, and the operation mode transitions sequentially in the order of the regenerative braking mode, the engine braking mode and the engine stationary mode as described above in the engine stop operation. This can lessen an increase and decrease in propulsion force not intended by an operator, thereby allowing the operator to perform proper operation.

Also, in the scooter-type motorcycle 100, in the regenerative braking mode during brake operation, when the vehicle speed is a specific speed at which the engine 210 can be stopped or higher, a misfire is caused in the engine 210, the decompression device 225 is turned on, and the engine 210 is cranked for regeneration. That is, the motor 230 performs regeneration in the cranking regeneration mode at a specific speed or higher.

When the vehicle speed is lower than the specific speed, in the scooter-type motorcycle 100, the motor 230 performs regeneration in the engine stationary regeneration mode in which a misfire is caused in the engine 210, the decompression device 225 is turned off, and the engine 210 is stopped. Thus, energy which would be wasted in brake operation can be used effectively to reduce energy loss during brake operation, thereby bringing the engine 210 to a complete stop efficiently.

In accordance with one construction, a driving device for a hybrid vehicle is provided, which includes an engine for producing power and a first rotary electric machine for functioning at least as an electric generator, among an electric motor and an electric generator. A power distribution device distributes the power produced by the engine to the first rotary electric machine and a driving wheel. A second rotary electric machine functions at least as an electric motor, among an electric motor and an electric generator, to produce power other than the power produced by the engine to drive the driving wheel. A storage battery stores the electricity generated by the first rotary electric machine and supplies electricity to at least the second rotary electric machine, among the first rotary electric machine and the second rotary electric machine. The driving device includes a pressure reduction device provided in the engine for reducing a compression pressure inside a cylinder of the engine created while cranking the engine, and a control section for controlling the engine, the first rotary electric machine and the second rotary electric machine and for driving the pressure reduction device to reduce the compression pressure inside the engine cylinder when stopping the engine.

With this construction of the hybrid vehicle having the power distribution device, when the engine is stopped by the first rotary electric machine and the second rotary electric machine, the pressure reduction device is driven to reduce the compression pressure inside the cylinder from the moment when cranking of the engine is started. In this way, in the hybrid vehicle having the power transmission device, cranking torque of the crankshaft of the engine which changes abruptly at engine stop can be decreased by reducing the compression pressure inside the engine cylinder and rotating the first rotary electric machine via the power distribution device. Thus, impact at engine stop can be reduced without increasing the capacity of the storage battery for supplying a current to the second rotary electric machine, or increasing the size of the motor because of an increase in the torque produced by the motor. Also, impact due to fluctuations in crankshaft torque which changes abruptly at engine stop can be reduced so that impact at a transition to an operating state related to engine stop can be reduced.

That is, the device is mountable on a vehicle such as a motorcycle which has a limited mounting space compared to an automobile and thus cannot secure a space for a battery which increases as its charging capacity increases. The device can lessen the impact at engine stop, which is caused by an increase and decrease in propulsion force not intended by an operator, thereby allowing the operator to perform proper operation.

In accordance with another construction of the driving device for a hybrid vehicle having the above constitution, when stopping the engine, the control section controls a rotational speed of the engine to 0 via the power distribution device by controlling the first rotary electric machine, stops ignition of and fuel supply to the engine, closes a throttle valve fully, and reduces the compression pressure inside the engine cylinder via the pressure reduction device.

With this construction, the engine is stopped by controlling its speed to 0 by controlling the first rotary electric machine, reducing the compression pressure inside the engine cylinder via the pressure reduction device, stopping ignition and fuel supply, and closing the throttle valve fully. In this way, in the hybrid vehicle having the power transmission device, cranking torque of the crankshaft of the engine which changes abruptly at engine stop can be decreased.

In accordance with another construction, of the driving device for a hybrid vehicle having the above constitution, when braking the vehicle to stop the engine, the control section causes the pressure reduction device to perform the pressure reducing operation, the second rotary electric machine to perform regeneration, and the storage battery to be charged by the regenerated electricity.

With this construction, when the vehicle is braking and before the engine comes to a complete stop, the compression pressure inside the engine cylinder is reduced, the second rotary electric machine performs regeneration through torque of the driving wheel produced as the vehicle runs, and the storage battery is charged thereby. That is, regenerative braking is operated when the vehicle is braking. Thus, energy which would be wasted during brake operation can be converted into electric energy and efficiently stored in the storage battery.

In accordance with another construction of the driving device for a hybrid vehicle having the above constitution, when the storage battery is charged up to its full capacity, the control section stops the pressure reducing operation of the pressure reduction device and the regeneration operation of the second rotary electric machine to cause the engine to rotate through torque of the driving wheel generated as the vehicle runs. The control section also makes a deceleration rate through the regeneration operation of the second rotary electric machine in agreement with a deceleration rate with the regeneration operation of the second rotary electric machine stopped.

With this construction, in the case where the storage battery cannot be charged by the electricity regenerated by the second rotary electric machine when the vehicle is braking, the pressure reducing operation by the pressure reduction device and the regeneration operation by the second rotary electric machine can be stopped so that the engine can be rotated through torque of the driving wheel with the pumping loss increased. That is, in the case where regenerative braking cannot be performed by regeneration of the second rotary electric machine when the vehicle is braking, the pressure reducing operation of the compression pressure inside the cylinder can be stopped and the engine with increased pumping loss can be rotated for engine cranking braking. This allows the regeneration operation in the hybrid vehicle to be performed effectively. Also, the deceleration rate through the regeneration operation of the second rotary electric machine is made in agreement with the deceleration rate with the regeneration operation of the second rotary electric machine stopped. That is, the deceleration rate of regenerative braking is made in agreement with that of crank braking. This can lessen impact at transition from regenerative braking to engine crank braking.

In accordance with another construction of the driving device for a hybrid vehicle having the above constitution, the pressure reduction device operates using a power medium other than hydraulic pressure of the engine.

With this construction, the pressure reduction device operates using a power medium other than the engine hydraulic pressure, and thus can be driven independently, regardless of whether the engine is operating or stationary.

In accordance with another construction, the driving device for a hybrid vehicle having the above constitution further includes an accelerator opening detection section for detecting an accelerator opening to output it to the control section; and a vehicle speed detection section for detecting a speed of the vehicle to output the detected vehicle speed to the control section. The control section includes an engine state determination section for determining whether or not to stop the engine based on the input accelerator opening and vehicle speed, and stops the engine based on the determination to stop the engine by the engine state determination section.

With this construction, since the engine is stopped based on the determination to stop the engine made based on the accelerator opening and the vehicle speed, the hybrid vehicle incorporating the driving device can immediately respond to a demand for engine stop from a user.

In accordance with another construction, the driving device for a hybrid vehicle having the above constitution further includes a brake detection section for detecting an amount of brake operation by a user, wherein the control section includes a brake determination section for determining whether or not the vehicle is braking based on the input accelerator opening, vehicle speed and brake operation amount when the engine state determination section determines not to stop the engine. When the brake determination section determines that the vehicle is braking, the control section rotates the second rotary electric machine or the engine through torque of the driving wheel by controlling the engine, the first rotary electric machine and the second rotary electric machine.

With this construction, when the hybrid vehicle incorporating the driving device is braking with the engine not stopped, i.e. decelerating, the second rotary electric machine or the engine can be rotated by torque of the driving wheel. By rotating the second rotary electric machine or the engine with rotational energy of the driving wheel, energy loss can be minimized so that the vehicle can brake efficiently.

In accordance with another construction, the driving device for a hybrid vehicle having the above constitution further includes a remaining battery level detection section for detecting a remaining charge level of the storage battery to output it to the control section, wherein the control section includes a regeneration determination section for causing the second rotary electric machine to perform regeneration through torque of the driving wheel generated as the vehicle runs and for determining whether or not the electricity regenerated by the second rotary electric machine can be stored in the storage battery based on the remaining charge level of the storage battery input from the remaining battery level detection section. When the brake determination section determines that the vehicle is braking and the regeneration determination section determines that the storage battery can be charged, the control section performs the pressure reducing operation via the pressure reduction device and causes the second rotary electric machine to perform regeneration through rotation of the driving wheel as an electric generator. When the brake determination section determines that the vehicle is braking and the regeneration determination section determines that the storage battery cannot be charged, the control section stops the pressure reducing operation of the pressure reduction device and rotates the engine through rotation of the driving wheel.

With this construction, when the vehicle incorporating the device is braking, the compression pressure inside the engine cylinder can be reduced and the second rotary electric machine can perform regeneration through torque of the driving wheel produced as the vehicle runs, so as to charge the storage battery. Thus, energy which would be lost during brake operation can be converted into electric energy and efficiently stored in the storage battery.

Also, in the case where the storage battery cannot be charged by the electricity regenerated by the second rotary electric machine when the vehicle is braking, the pressure reducing operation by the pressure reduction device can be stopped so that the engine can be rotated through torque of the driving wheel with the pumping loss increased. That is, in the case where regenerative braking cannot be performed by regeneration of the second rotary electric machine when the vehicle is braking, the pressure reducing operation of the compression pressure inside the cylinder can be stopped so as to rotate the engine itself with increased pumping loss to achieve cranking braking. This allows the regeneration operation in the hybrid vehicle to be performed effectively.

In accordance with another construction, a hybrid vehicle includes an engine for producing power and a first rotary electric machine that functions at least as an electric generator, among an electric motor and an electric generator. A power distribution device distributes the power produced by the engine to the first rotary electric machine and a driving wheel. A second rotary electric machine functions at least as an electric motor, among an electric motor and an electric generator, to produce power other than the power produced by the engine to drive the driving wheel. A storage battery stores the electricity generated by the first rotary electric machine and supplies electricity to at least the second rotary electric machine, among the first rotary electric machine and the second rotary electric machine. A pressure reduction device provided in the engine reduces a compression pressure inside a cylinder of the engine created while cranking the engine, and a control section controls the engine, the first rotary electric machine and the second rotary electric machine and drives the pressure reduction device to reduce the compression pressure inside the engine cylinder when stopping the engine.

With this construction, when the engine is stopped by the first rotary electric machine and the second rotary electric machine, the pressure reduction device is driven to reduce the compression pressure inside the cylinder from the moment when cranking of the engine is started. In this way, in the hybrid vehicle having the power transmission device, cranking torque of the crankshaft of the engine which changes abruptly at engine stop can be decreased by reducing the compression pressure inside the engine cylinder and rotating the first rotary electric machine via the power distribution device. Thus, impact at engine stop can be reduced without increasing the capacity of the storage battery for supplying a current to the second rotary electric machine, and increasing the size of the motor because of an increase in the torque produced by the motor.

That is, the device is mountable on a vehicle such as a motorcycle which has a limited mounting space compared to an automobile and thus cannot secure a space for a battery which increases as its charging capacity increases. The device can lessen the impact at engine stop, which is caused by an increase and decrease in propulsion force not intended by an operator, thereby allowing the operator to perform proper operation.

In accordance with another construction, the hybrid vehicle having the above constitution further includes an accelerator opening detection section for detecting an accelerator opening, a vehicle speed detection section for detecting a speed of the vehicle, a brake detection section for detecting an amount of brake operation by a user, and a charge amount detection section for detecting an amount of electric charge stored in the storage battery. The control section has plural operation modes in which the first rotary electric machine, the second rotary electric machine and the engine are controlled based on the accelerator opening, vehicle speed, brake operation amount and charge amount input when braking the vehicle. The plural operation modes include a vehicle stationary mode in which the engine experiences a misfire and comes to a complete stop, a first regenerative braking mode effected when the vehicle speed is not lower than a specific speed, in which the pressure reduction device is driven, the engine experiences a misfire and is cranked, and the second rotary electric machine performs regeneration through torque of the driving wheel via the power distribution device to charge the storage battery, a second regenerative braking mode effected when the vehicle speed is lower than the specific speed, in which the pressure reduction device is stopped, the engine experiences a misfire and is cranked, and the second rotary electric machine performs regeneration through torque of the driving wheel via the power distribution device to charge the storage battery, and an engine braking mode effected when the storage battery is charged up to its full capacity, in which the pressure reduction device is stopped, the engine experiences a misfire and is cranked, and the engine rotates through torque of the driving wheel via the power distribution device.

With this construction, the operating state of the vehicle can be determined by engine control such as driving (on and off) of the first rotary electric machine, the second rotary electric machine and the pressure reduction device, depending on the operation mode including the stationary mode, the first and the second regenerative braking mode and the engine braking mode. Thus, even when the operating state is switched between the operation modes, a sudden change in torque of the engine crankshaft can be suppressed appropriately, whether the pressure reduction device is being driven or not, depending on the operating condition. Therefore, it is possible to prevent an increase and decrease in the driving wheel propulsion force not intended by an operator as the operating state of the engine transitions. Specifically, in the case where the vehicle speed is a specific speed or higher when the vehicle is braking, the first regenerative braking mode is effected in which the pressure reduction device is driven, the engine experiences a misfire and is cranked, and the second rotary electric machine performs regeneration via the power distribution device, and when the vehicle speed is lower than the specific speed, the second regenerative braking mode is effected in which regeneration is performed with the engine stopped. In this way, since a transition is made from the first regenerative braking mode to the second regenerative braking mode at the specific speed when the vehicle is decelerating, energy loss during deceleration can be reduced and the engine can be efficiently brought to a complete stop.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention.

Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A hybrid vehicle, comprising:
an engine for producing power;
a first rotary electric machine configured to operate as at least one of an electric generator and an electric motor;
a power distribution device configured to distribute the power produced by the engine to the first rotary electric machine and to a driving wheel;
a second rotary electric machine configured to operate as at least one of an electric motor and an electric generator to produce power to drive the driving wheel;
a battery that stores electricity generated by the first rotary electric machine and supplies electricity to at least one of the second rotary electric machine and the first rotary electric machine; and
a driving device including:
a pressure reduction device provided in the engine for reducing a compression pressure inside a cylinder of the engine created while cranking the engine; and
a controller configured to control the pressure reduction device so as to reduce the compression pressure inside the engine cylinder when stopping the engine, the controller also configured to control at least some operations of the engine, the first rotary electric machine and the second rotary electric machine, wherein the controller, when stopping the engine, reduces a rotational speed of the engine via the power distribution device by controlling the first rotary electric machine, by stopping ignition of and fuel supply to the engine, by closing a throttle valve, and by reducing the compression pressure inside the engine cylinder via the pressure reduction device.

2. A hybrid vehicle according to claim 1, wherein, when braking the vehicle to stop the engine, the controller controls the pressure reduction device to perform the pressure reducing operation, and controls the second rotary electric machine to perform power regeneration to generate electricity that is transmitted to the battery to charge the battery.

3. A hybrid vehicle according to claim 2, wherein, when the storage battery is charged up to its full capacity, the controller stops the pressure reducing operation of the pressure reduction device and the regeneration operation of the second rotary electric machine to cause the engine to rotate through torque transmitted from the driving wheel and generated as the vehicle runs, and the controller synchronizes a deceleration rate achieved through the regeneration operation of the second rotary electric machine with a deceleration rate achieved with the regeneration operation of the second rotary electric machine stopped.

4. A hybrid vehicle according to claim 1, wherein the pressure reduction device operates using a power medium other than hydraulic pressure of the engine.

5. A hybrid vehicle according to claim 1, wherein the driving device further comprises:
an accelerator opening detector coupled with an accelerator and communicating an accelerator opening to the controller; and
a vehicle speed detector communicating a detected vehicle speed to the controller,
wherein the controller includes an engine state determination section for determining whether or not to stop the engine based on the input accelerator opening and vehicle speed, and is configured to stop the engine based on the determination to stop the engine by the engine state determination section.

6. A hybrid vehicle according to claim 1, wherein the driving device further comprises:
a brake detector for detecting an amount of brake operation by a user,
wherein the controller includes a brake determination section for determining whether or not the vehicle is braking based on the input accelerator opening, vehicle speed and brake operation amount when the engine state determination section determines not to stop the engine, and when the brake determination section determines that the vehicle is braking, and wherein the controller is configured to cause the second rotary electric machine or the engine to through torque of the driving wheel by controlling the engine, the first rotary electric machine and the second rotary electric machine.

7. A hybrid vehicle according to claim 6, wherein the driving device further comprises:
a remaining battery level detector for detecting a remaining charge level of the battery to output the detected level to the controller,
wherein the controller includes a regeneration determination section for causing the second rotary electric machine to perform power regeneration through torque generated by the driving wheel as the vehicle runs and for determining whether or not the electricity regenerated by the second rotary electric machine can be stored in the battery based on the remaining charge level of the battery input from the remaining battery level detector, and when the brake determination section determines that the vehicle is braking and the regeneration determination section determines that the battery can be charged, performs the pressure reducing operation via the pressure reduction device and causes the second rotary electric machine to perform regeneration through rotation of the driving wheel as an electric generator, and when the brake determination section determines that the vehicle is braking and the regeneration determination section determines that the battery cannot be charged, stops the pressure reducing operation of the pressure reduction device and rotates the engine through rotation of the driving wheel.

8. A hybrid vehicle comprising:
an engine for producing power;
a first rotary electric machine configured to operate as at least one of an electric generator and an electric motor;
a power distribution device configured to distribute the power produced by the engine to the first rotary electric machine and to a driving wheel;
a second rotary electric machine configured to operate as at least one of an electric motor and an electric generator to produce power to drive the driving wheel;
a battery that stores the electricity generated by the first rotary electric machine and supplies electricity to at least one of the second rotary electric machine and the first rotary electric machine;
a pressure reduction device provided in the engine for reducing a compression pressure inside a cylinder of the engine created while cranking the engine;
an accelerator opening detection section for detecting an accelerator opening;

a vehicle speed detection section for detecting a speed of the vehicle;

a brake detection section for detecting an amount of brake operation by a user;

a charge amount detection section for detecting an amount of electric charge stored in the battery; and a controller for controlling the engine, the first rotary electric machine and the second rotary electric machine and for controlling the pressure reduction device to reduce the compression pressure inside the engine cylinder when stopping the engine, wherein the controller has plural operation modes in which the first rotary electric machine, the second rotary electric machine and the engine are controlled based on the accelerator opening, vehicle speed, brake operation amount and charge amount input when braking the vehicle, the plural operation modes including:

a vehicle stationary mode in which the engine experiences a misfire and comes to a complete stop, a first regenerative braking mode effected when the vehicle speed is not lower than a specific speed, in which the pressure reduction device is driven, the engine experiences a misfire and is cranked, and the second rotary electric machine performs regeneration through torque of the driving wheel via the power distribution device to charge the storage battery, a second regenerative braking mode effected when the vehicle speed is lower than the specific speed, in which the pressure reduction device is stopped, the engine experiences a misfire and is cranked, and the second rotary electric machine performs regeneration through torque of the driving wheel via the power distribution device to charge the battery, and an engine braking mode effected when the storage battery is charged up to its full capacity, in which the pressure reduction device is stopped, the engine experiences a misfire and is cranked, and the engine rotates through torque of the driving wheel via the power distribution device.

9. A hybrid vehicle, comprising:

an engine for producing power;

a first rotary electric machine configured to operate as at least one of an electric generator and an electric motor;

a power distribution device configured to distribute the power produced by the engine to the first rotary electric machine and to a driving wheel;

a second rotary electric machine configured to operate as at least one of an electric motor and an electric generator to produce power to drive the driving wheel;

a battery that stores electricity generated by the first rotary electric machine and supplies electricity to at least one of the second rotary electric machine and the first rotary electric machine; and a driving device including:

a pressure reduction device provided in the engine for reducing a compression pressure inside a cylinder of the engine created while cranking the engine;

a controller configured to control the pressure reduction device so as to reduce the compression pressure inside the engine cylinder when stopping the engine;

an accelerator opening detector coupled with an accelerator and communicating an accelerator opening to the controller; and a vehicle speed detector communicating a detected vehicle speed to the controller, wherein the controller includes an engine state determination section for determining whether or not to stop the engine based on the input accelerator opening and vehicle speed, and is configured to stop the engine based on the determination to stop the engine by the engine state determination section.

10. A hybrid vehicle, comprising:

an engine for producing power;

a first rotary electric machine configured to operate as at least one of an electric generator and an electric motor;

a power distribution device configured to distribute the power produced by the engine to the first rotary electric machine and to a driving wheel;

a second rotary electric machine configured to operate as at least one of an electric motor and an electric generator to produce power to drive the driving wheel;

a battery that stores electricity generated by the first rotary electric machine and supplies electricity to at least one of the second rotary electric machine and the first rotary electric machine; and a driving device including:

a pressure reduction device provided in the engine for reducing a compression pressure inside a cylinder of the engine created while cranking the engine;

a controller configured to control the pressure reduction device so as to reduce the compression pressure inside the engine cylinder when stopping the engine; and a brake detector for detecting an amount of brake operation by a user, wherein the controller includes a brake determination section for determining whether or not the vehicle is braking based on the input accelerator opening, vehicle speed and brake operation amount when the engine state determination section determines not to stop the engine, and when the brake determination section determines that the vehicle is braking, and wherein the controller is configured to cause the second rotary electric machine or the engine to through torque of the driving wheel by controlling the engine, the first rotary electric machine and the second rotary electric machine.

11. A hybrid vehicle, comprising:

an engine for producing power;

a first rotary electric machine configured to operate as at least one of an electric generator and an electric motor;

a power distribution device configured to distribute the power produced by the engine to the first rotary electric machine and to a driving wheel;

a second rotary electric machine configured to operate as at least one of an electric motor and an electric generator to produce power to drive the driving wheel;

a battery that stores electricity generated by the first rotary electric machine and supplies electricity to at least one of the second rotary electric machine and the first rotary electric machine; and a driving device including:

a pressure reduction device provided in the engine for reducing a compression pressure inside a cylinder of the engine created while cranking the engine;

a controller configured to control the pressure reduction device so as to reduce the compression pressure inside the engine cylinder when stopping the engine; and a remaining battery level detector for detecting a remaining charge level of the battery to output the detected level to the controller, wherein the controller includes a regeneration determination section for causing the second rotary electric machine to perform power regeneration through torque generated by the driving wheel as the vehicle runs and for determining whether or not the electricity regenerated by the second rotary electric machine can be stored in the battery based on the remaining charge level of the battery input from the remaining battery level detector, and when the brake determination section determines that the vehicle is braking and the regeneration determination section determines that the battery can be charged, performs the pressure reducing operation via the pressure reduction device and causes the second rotary electric machine to perform regeneration through rotation of the driving wheel as an electric generator, and when the brake determination section determines that the vehicle is braking and the regeneration determination section determines that the battery cannot be charged, stops the pressure reducing operation of the pressure reduction device and rotates the engine through rotation of the driving wheel.

* * * * *

UNITED STATES PATENT AND TRADEMARK OFFICE
CERTIFICATE OF CORRECTION

PATENT NO. : 7,527,111 B2
APPLICATION NO. : 11/426244
DATED : May 5, 2009
INVENTOR(S) : Arai Katsuhiro et al.

It is certified that error appears in the above-identified patent and that said Letters Patent is hereby corrected as shown below:

At column 30, line 19, please delete "to through", and insert --to rotate through--, therefor.

At column 32, line 36, please delete "to through", and insert --to rotate through--, therefor.

Signed and Sealed this

Nineteenth Day of January, 2010

David J. Kappos
*Director of the United States Patent and Trademark Office*